US011852736B2

(12) United States Patent
Lee et al.

(10) Patent No.: US 11,852,736 B2
(45) Date of Patent: Dec. 26, 2023

(54) ELECTRONIC DEVICE INCLUDING ANTENNA FOR MEASURING ANGLE OF ARRIVAL

(71) Applicant: Samsung Electronics Co., Ltd., Gyeonggi-do (KR)

(72) Inventors: Muyeol Lee, Gyeonggi-do (KR); Seunghoon Kim, Gyeonggi-do (KR); Jeongsik Kim, Gyeonggi-do (KR); Changwoo Son, Gyeonggi-do (KR); Jiwoo Lee, Gyeonggi-do (KR)

(73) Assignee: Samsung Electronics Co. Ltd

( * ) Notice: Subject to any disclaimer, the term of this patent is extended or adjusted under 35 U.S.C. 154(b) by 257 days.

(21) Appl. No.: 17/321,924

(22) Filed: May 17, 2021

(65) Prior Publication Data

US 2021/0356550 A1 Nov. 18, 2021

(30) Foreign Application Priority Data

May 15, 2020 (KR) ........................ 10-2020-0058323

(51) Int. Cl.
*G01S 3/48* (2006.01)
*G01S 3/50* (2006.01)
*H01Q 1/52* (2006.01)

(52) U.S. Cl.
CPC .................. *G01S 3/48* (2013.01); *G01S 3/50* (2013.01); *H01Q 1/526* (2013.01)

(58) Field of Classification Search
CPC .............. G01S 3/48; G01S 3/50; H01Q 1/526
USPC .......................... 342/417, 445, 465, 451, 458
See application file for complete search history.

(56) References Cited

U.S. PATENT DOCUMENTS

| 5,786,793 A | 7/1998 | Maeda et al. |
| 8,681,048 B2 | 3/2014 | Nishida |
| 2011/0102289 A1* | 5/2011 | Leem .................. H01Q 1/2283 343/893 |
| 2018/0076875 A1 | 3/2018 | Haverinen et al. |

(Continued)

FOREIGN PATENT DOCUMENTS

KR 1020190098529 8/2019

OTHER PUBLICATIONS

International Search Report dated Aug. 31, 2021 issued in counterpart application No. PCT/KR2021/006012, 6 pages.

*Primary Examiner* — Bo Fan
(74) *Attorney, Agent, or Firm* — The Farrell Law Firm, P.C.

(57) ABSTRACT

An electronic device is provided. The electronic device includes a flexible printed circuit board (FPCB) including a first conductive patch and a second conductive patch, a wireless communication circuitry electrically coupled with the first conductive patch and the second conductive patch, and a processor electrically coupled with the wireless communication circuitry. The first conductive patch is fed from the wireless communication circuitry at a first point located at a first edge of the first conductive patch or a second point located at a second edge different from the first edge, and operates as an antenna radiator which receives a radio frequency (RF) signal of a specified frequency band, the second conductive patch is fed from the wireless communication circuity at a third point of the second conductive patch, and operates as an antenna radiator which transmits or receive an RF signal of a specified frequency band.

20 Claims, 22 Drawing Sheets

(56) References Cited

U.S. PATENT DOCUMENTS

| | | | |
|---|---|---|---|
| 2018/0254870 A1 | 9/2018 | Dutz et al. | |
| 2019/0097317 A1 | 3/2019 | Di Nallo et al. | |
| 2019/0386397 A1* | 12/2019 | Son | H04B 1/40 |
| 2020/0127387 A1* | 4/2020 | Park | H01Q 21/24 |

* cited by examiner

ELECTRONIC DEVICE INCLUDING ANTENNA FOR MEASURING ANGLE OF ARRIVAL

CROSS-REFERENCE TO RELATED APPLICATION(S)

This application is based on and claims priority under 35 U.S.C. § 119 to Korean Patent Application No. 10-2020-0058323, which was filed in the Korean Intellectual Property Office on May 15, 2020, the entire disclosure of which is incorporated herein by reference.

BACKGROUND

1. Field

The present disclosure relates generally to an electronic device including an antenna.

2. Description of Related Art

With the development of a wireless communication technology, a connectivity technology has emerged in which an electronic device is coupled with an external device to provide various functions. For example, the electronic device may detect a location of the electronic device itself or the external device (e.g., an IoT device), based on wireless communication of the electronic device with respect to the external device. Based on the detected location, the electronic device may control various functions of the external device, or may provide various location-based services to a user who has the electronic device.

Meanwhile, an ultra-wide band (UWB) communication technology which can obtain positioning information (distance information and angle of arrival (AOA) information) by transmitting/receiving a location detection message (or a ranging message) is applied to precisely detect the location of the electronic device itself and/or the location of the external electronic device.

The electronic device may include a plurality of UWB antennas to measure a location by using the UWB communication technology. For example, the electronic device may measure a direction and distance of a transmitting device by using two UWB antennas, and may measure a location of the transmitting device, based on the measured direction and distance. In addition, the electronic device may include a UWB antenna system capable of generating multiple resonances to implement a broadband.

In general, performance of location measurement using the UWB may have an error of about 30 cm in a line-of-sight (LOS) environment. On the contrary, accuracy of the location measurement may be degraded in a non-line-of-sight (NLOS) environment (e.g., a parking lot) in which many obstacles are present or many vehicles are present and cause congestion. In particular, when in an obstacle environment which interferes with radio waves or when the electronic device is in a user's back pocket, the error of location measurement may increase due to human body interference.

In theory, an electronic device including two UWB antennas can measure only an AOA of a signal received in the range of 180° with respect to the electronic device. Therefore, it is difficult to recognize whether an external electronic device is located to the left or right of the electronic device. In addition, the electronic device including the two UWB antennas has difficulty in measuring a location adaptively in various communication environments.

That is, in order to measure an AOA of a signal received in all directions of the electronic device and to measure a location adaptively in the various communication environments, at least three UWB antennas densely disposed within a specified distance (e.g., λ/2 distance) in the electronic device shall be provided. However, the electronic device tends to be thin in thickness and gradually small in size. Also, a growing number of components are disposed inside the electronic device to perform various functions. Under such a space constraint in the electronic device, it may be difficult to implement the at least three UWB antennas densely disposed within the specified distance.

SUMMARY

Accordingly, an aspect of the disclosure is to provide an electronic device capable of detecting a location of an external electronic device located in all directions, through a feeding structure of two UWB antennas.

In accordance with an aspect of the present disclosure, an electronic device is provided. The electronic device includes a flexible printed circuit board (FPCB) including a first conductive patch and a second conductive patch, a wireless communication circuitry electrically coupled with the first conductive patch and the second conductive patch, and a processor electrically coupled with the wireless communication circuitry. The first conductive patch is fed from the wireless communication circuitry at a first point located at a first edge of the first conductive patch or a second point located at a second edge different from the first edge, and operates as an antenna radiator which receives a radio frequency (RF) signal of a specified frequency band, the second conductive patch is fed from the wireless communication circuity at a third point of the second conductive patch, and operates as an antenna radiator which transmits or receive an RF signal of a specified frequency band, the first conductive patch and the second conductive patch overlap at least partially, when viewed on a horizontal axis of the FPCB, a distance between the first point and the third point is a first specified distance less than or equal to a half wavelength λ/2 of the RF signal, distance between the second point and the third point is a second specified distance less than the first specified distance, and a first line segment which connects the first point and the third point has a slope different from that of a second line segment which connects the second point and the third point.

In accordance with an aspect of the present disclosure, an electronic device is provided. The electronic device includes an FPCB including a first conductive patch and a second conductive patch, a wireless communication circuitry electrically coupled with the first conductive patch and the second conductive patch, and a processor electrically coupled with the wireless communication circuitry. The first conductive patch is fed from the wireless communication circuitry at a first point located at a first edge of the first conductive patch or a second point located at a second edge different from the first edge, and operates as an antenna radiator which receives an RF signal of a specified frequency band, the second conductive patch is fed from the wireless communication circuity at a third point of the second conductive patch, and operates as an antenna radiator which transmits or receive an RF signal of a specified frequency band, the first conductive patch and the second conductive patch overlap at least partially, when viewed on a horizontal axis of the FPCB, a distance between the first point and the third point is a first specified distance less than or equal to a half wavelength λ/2 of the RF signal, a distance between the second point and the third point is a second specified distance less than the first specified distance, the third point is disposed to an edge farthest from the second point among edges of the second conductive patch, and a first line segment which connects the first point and the third point has a slope different from that of a second line segment Which connects the second point and the third point.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
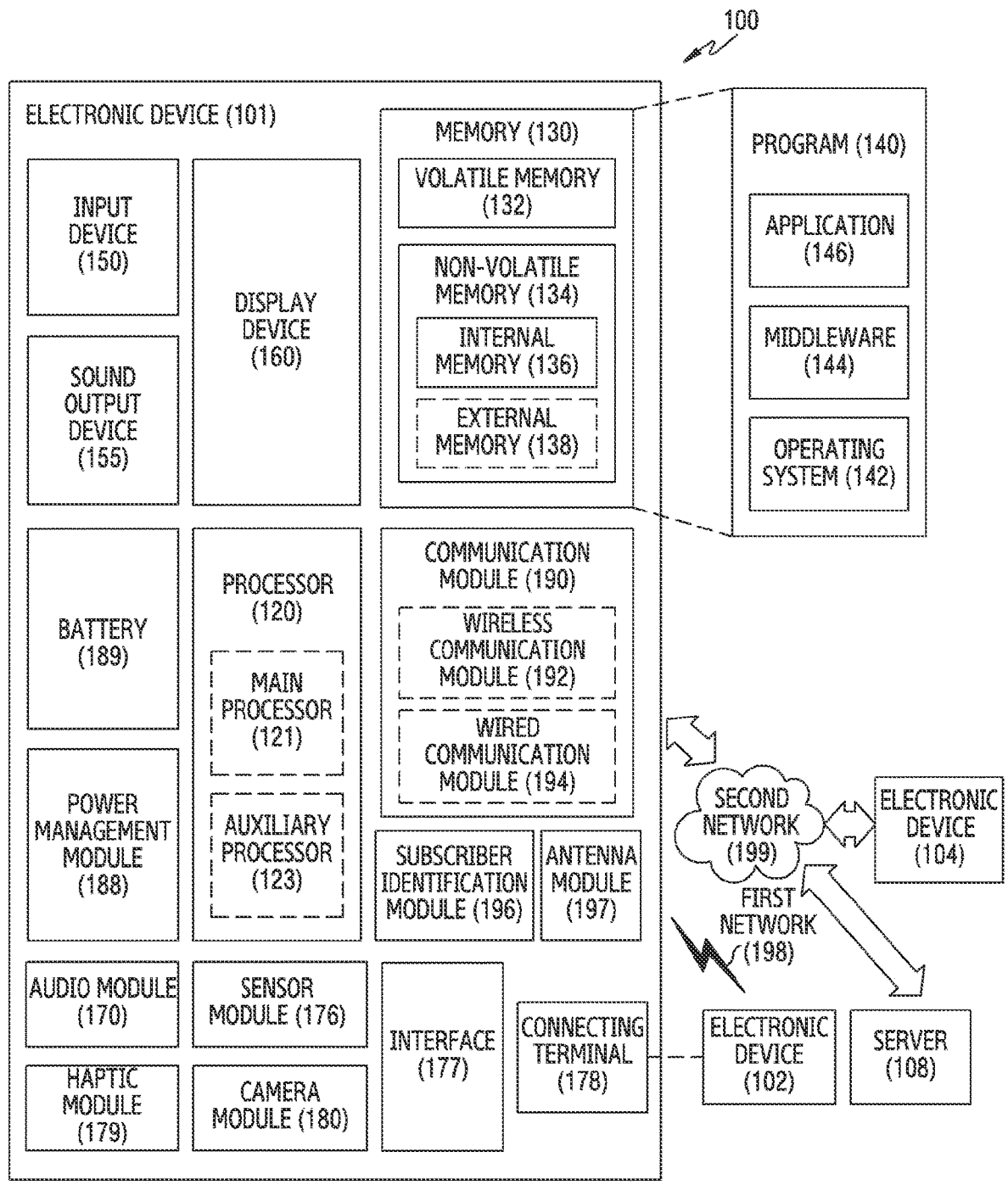
FIG. 1 is a block diagram of an electronic device in a network environment, according to an embodiment.

FIG. 1 is a block diagram illustrating an electronic device 101 in a network environment 100, according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (CMS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. However, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively, or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2A:
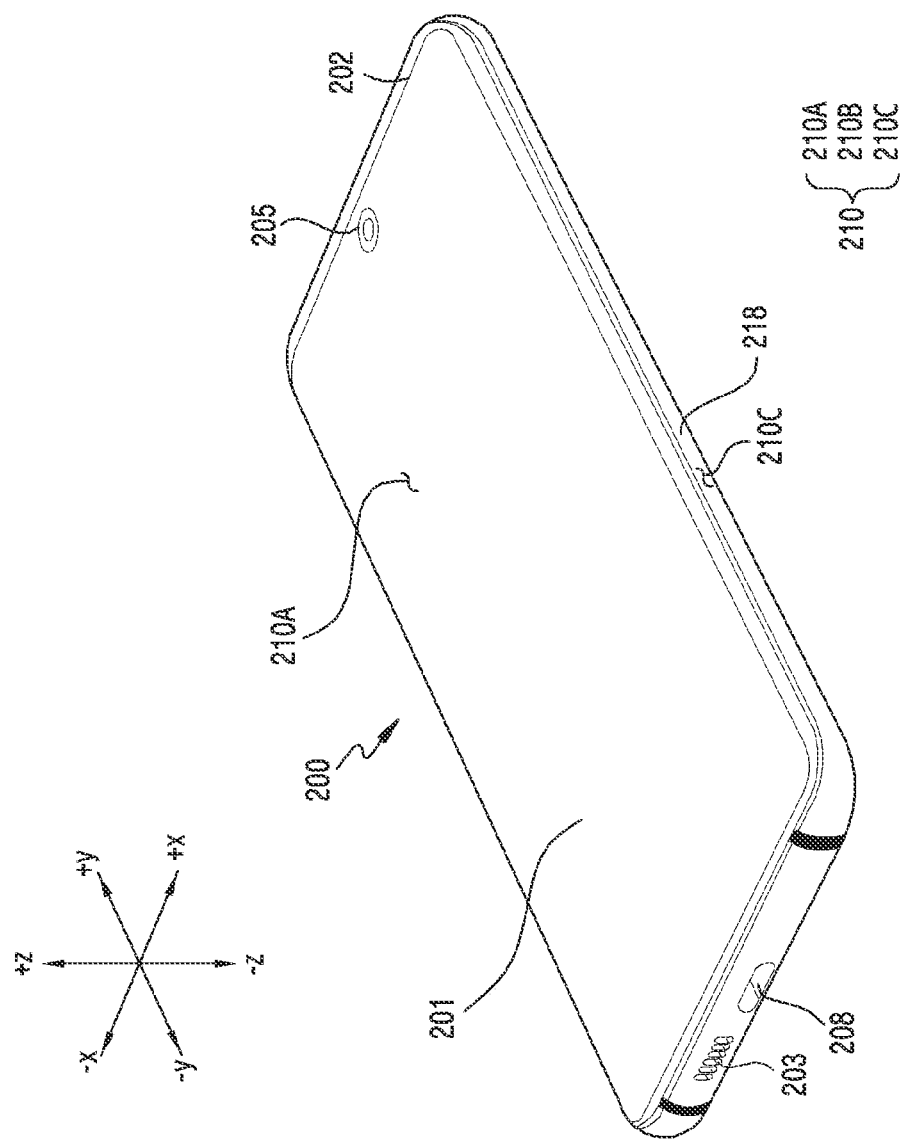
FIG. 2A is a front perspective view of an electronic device, according to an embodiment.

FIG. 2A is a front perspective view of an electronic device 200, according to an embodiment.

Figure 2B:
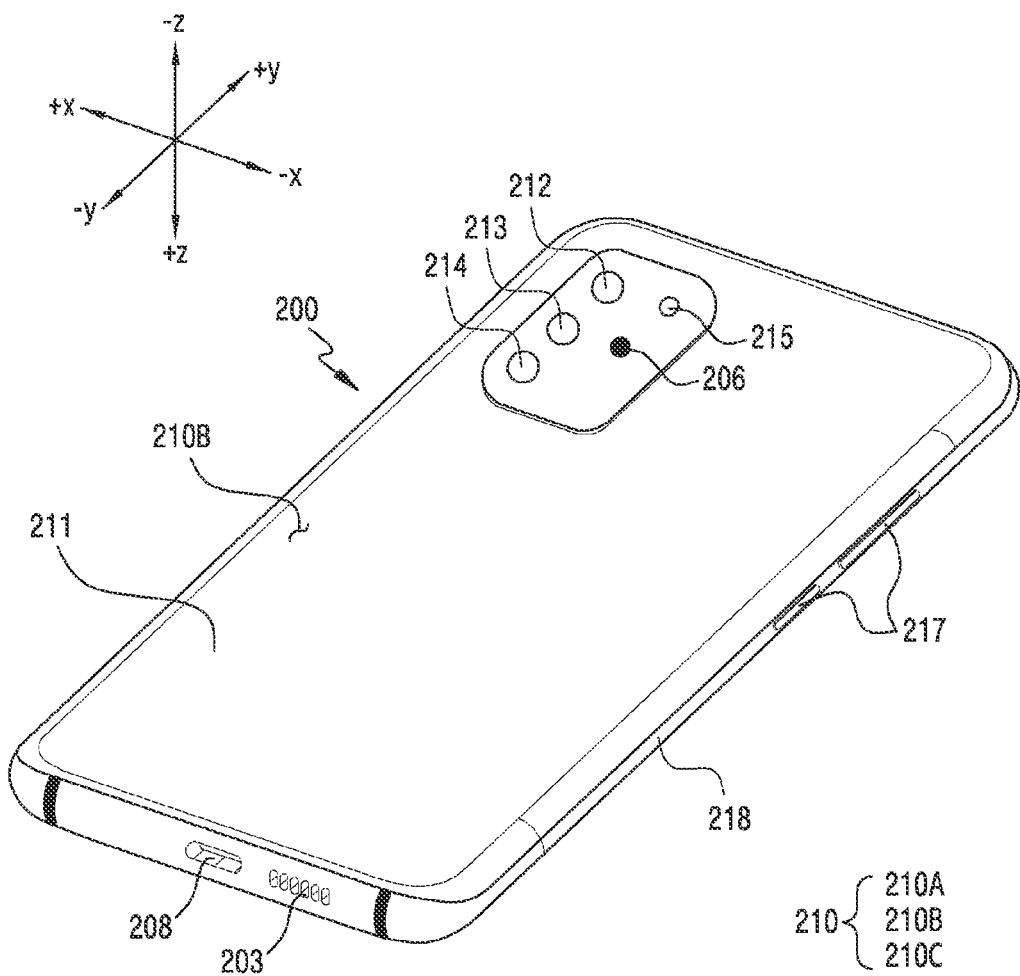
FIG. 2B is a rear perspective view of the electronic device of FIG. 2A, according to an embodiment.

FIG. 2B is a rear perspective view of the electronic device 200 of FIG. 2A, according to an embodiment.

Referring to FIG. 2A and FIG. 2B, the electronic device 200 may include a housing 210 including a first face (or a "front face") 210A, a second face (or a "back face") 210B, and a side face (or a "side wall") 210C surrounding a space between the first face 210A and the second face 210B. The housing 210 may refer to a structure which constitutes part of the first face 210A, second face 210B, and the side face 210C of FIG. 2A and FIG. 2B.

The first face 210A may be constructed of a front plate 202 (e.g., a polymer plate or a glass plate having various coating layers) which is at least partially transparent substantially. The front plate 202 may include a curved portion seamlessly extending by being bent from the first face 210A toward a back plate 211 at least in a side edge portion.

The second face 210B may be constructed of the back plate 211 which is opaque substantially. The back plate 211 may be constructed of coated or colored glass, ceramic, polymer, metallic materials (e.g. aluminum, stainless steel, or magnesium) or a combination of at least two of the these materials. The back plate 211 may include a curved portion seamlessly extending by being bent from the second face 210B toward the front plate 202 at least in a side edge portion.

The side face 210C may be constructed of a side member (or a bracket) 218 joined with the front plate 202 and the back plate 211 and including metal and/or polymer. The back plate 211 and the side member 218 may be constructed integrally and may include the same material (e.g., a metallic material such as aluminum).

The electronic device 200 may include at least one or more of a display 201, an audio module 203, a sensor module, at least one of camera modules 205, 212, 213, 214, and 215, a flash 206, a key input device 217, and a connector hole 208. The electronic device 200 may omit at least one of components (e.g., the key input device), or may additionally include other components. The electronic device 200 may additionally include a sensor module. The sensor module may include at least one of an optical sensor, an ultrasonic sensor, and/or a capacitive sensor. The sensor module may be disposed on a back face of a screen display region of the display 201 and/or a periphery portion of the display 201. The screen display region may be a region of the display 210, visible through the front plate 202 of the electronic device 200. The electronic device 200 may further include a light emitting element, and the light emitting element may be disposed at a location adjacent to the display 201 in a region provided by the front plate 202. The light emitting element may provide state information of the electronic device 200 in an optical form. The light emitting element may provide a light source associated with an operation of the first camera module 205. The light emitting element may include a light emitting diode (LED), an infrared (IR) LED, and xenon lamp.

The display 201 may be visible from the outside of the electronic device 200 through some portions of the front plate 202, An edge of the display 201 may be constructed to have substantially the same shape as an outer boundary (e.g., a curved portion) adjacent to the front plate 202. In order to expand an area in which the display 201 is exposed, the display 201 and the front plate 202 may be constructed to have substantially the same interval between outer boundaries thereof. A recess, a notch, or an opening may be disposed on part of a screen display region of the display 201, and other electronic components, the first camera module 205, a proximity sensor, or an illumination sensor, aligned with the recess, the notch, or the opening may be included.

The electronic device 200 may include at least one of the camera modules 205, 212, 213, 214, and 215, a fingerprint sensor, and/or a flash 206 on a back face of the screen display region of the display 201. The display 201 may be disposed adjacent to or joined with a touch sensing circuitry, a pressure sensor capable of measuring touch strength (pressure), and/or a digitizer for detecting a magnetic-type stylus pen.

The audio module 203 may include a microphone hole and/or a speaker hole. The microphone hole may have a microphone disposed inside thereof to acquire external sound. A plurality of microphones may be disposed to detect a sound direction. The speaker hole and the microphone hole may be implemented with one hole (e.g., the audio module 203), or the speaker (e.g., a piezo speaker) may be included without the speaker hole. The speaker hole may include an external speaker hole and/or a communication receiver hole.

The electronic device 200 may include a sensor module to generate an electrical signal or data value corresponding to an internal operational state or an external environment state. The sensor module may further include a proximity sensor disposed on the first face 210A of the housing 210, a fingerprint sensor disposed integrally or adjacent to the display 210, and/or a biometric sensor (e.g., a heart rate monitoring (HRM) sensor) disposed on the second face 210B of the housing 210. The electronic device 200 may further include at least one of sensor modules, a gesture sensor, a gyro sensor, an atmospheric pressure sensor, a magnetic sensor, an acceleration sensor, a grip sensor, a color sensor, an IR sensor, a biometric sensor, a temperature sensor, a humidity sensor, and an illuminance sensor.

Among the at least one of the camera modules 205, 212, 213, 214, and 215, the first camera module 205 may be disposed on the first face 210A of the electronic device 200, and the second camera modules 212, 213, 214, and 215 and the flash 206 may be disposed on the second face 210B of the electronic device 200. The aforementioned at least one of the camera modules 205, 212, 213, 214, and 215 may include one or more lenses, an image sensor, and/or an ISP. The flash 206 may include an LED or a xenon lamp. Two or more lenses (IR cameras, wide angle and telephoto lenses) and image sensors may be disposed on a face of the electronic device 200.

The key input device 217 may be disposed on the side face 210C of the housing 210. The electronic device 200 may not include the entirety or part of the aforementioned key input device 217. The key input device 217, which is not included, may be implemented on the display 201 in a different form such as a soft key or the like. The key input device may include at least part of a fingerprint sensor disposed on the second face 210B of the housing 210.

The connector hole 208 may house a connector for transmitting/receiving power and/or data of an external electronic device and/or a connector for transmitting/receiving an audio signal with respect to the external electronic device. The connector hole 208 may include a USB connector or an earphone jack. The USB connector and the earphone jack may be implemented as one hole (e.g., 208 of FIG. 2A and FIG. 2B). The electronic device 200 may transmit/receive power and/or data with an external electronic device without an additional connector hole, or may transmit/receive an audio signal.

Figure 3:
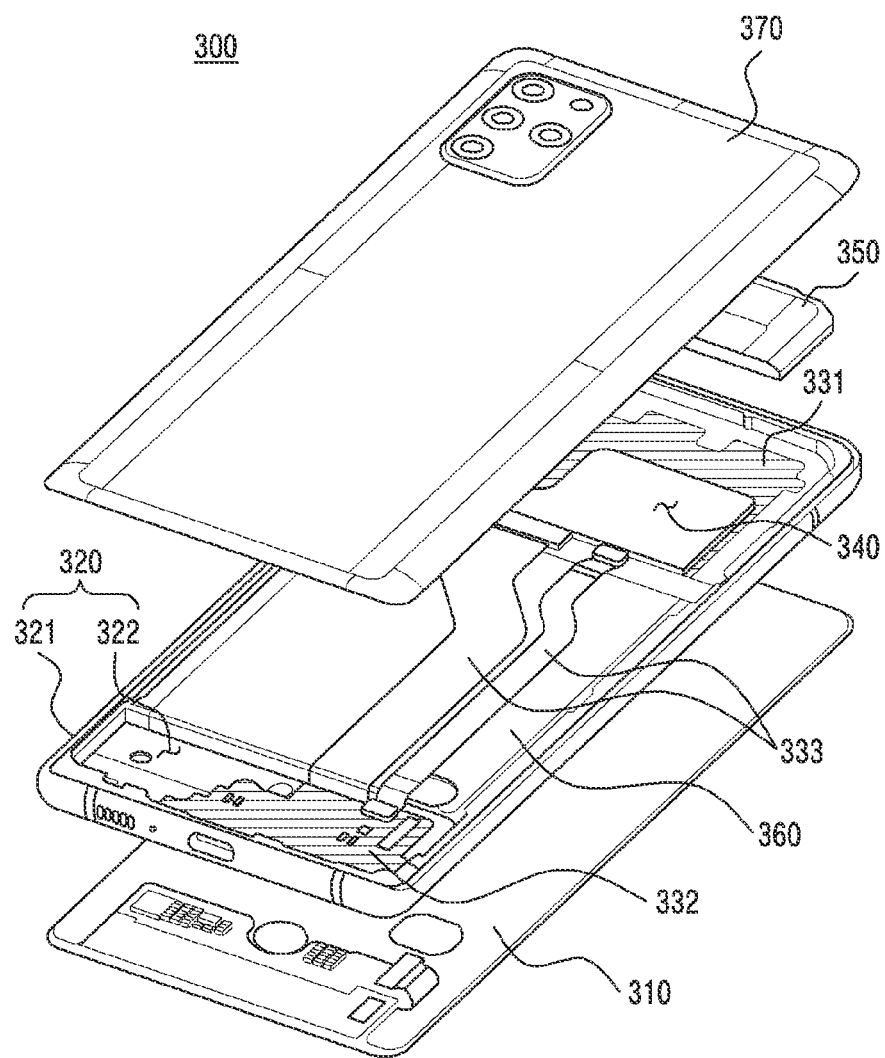
FIG. 3 is an exploded perspective view of an electronic device, according to an embodiment.

FIG. 3 is an exploded perspective view of an electronic device 300, according to an embodiment.

Referring to FIG. 3, the electronic device 300 may include a front plate, a display 310, a side member 320, at least one PCB 330, a first support structure 340 (e.g., or a shield can), a second support structure 350, a battery 360, and/or a back plate 370. At least one of the components of the electronic device 300 may be the same as or similar to at least one of the components of the electronic device 101 of FIG. 1 and/or the electronic device 200 of FIG. 2A and FIG. 2B, and redundant descriptions will be omitted hereinafter.

The side member 320 may include a metal frame structure 321 and/or a support member 322.

The metal frame structure 321 may be constructed of a conductive material (e.g., metal) to constitute a side face of the electronic device 300. The metal frame structure 321 may include at least one conductive portion and/or at least one non-conductive portion which insulates the at least one conductive portion. At least one conductive portion of the aforementioned metal frame structure 321 may operate as an antenna radiator which transmits and/or receives an RF signal of a specified frequency band.

The support member 322 may be constructed of a metal material and/or a non-metal (e.g., polymer) material to provide a space in which electronic components can be disposed inside the electronic device 300. The display 310 may be disposed on a face of the support member 322 (e.g., a face in the direction of FIG. 3), and the at least one PCB 330 may be disposed on another face of the support member 322 (e.g., a face in the −z direction of FIG. 3). The support member 322 may be coupled with the metal frame structure 321, or may be constructed integrally with the metal frame structure 321.

A plurality of electronic components may be disposed on the at least one PCB 330. A processor, a memory, and/or an interface may be disposed on the at least one PCB 330. The processor may include one or more of a CPU, an AP, a GPU, an ISP, a sensor hub processor, and a CP. The memory may include a volatile memory or a non-volatile memory. The interface may include an HDMI, a USB interface, a SD card interface, and/or an audio interface. The interface may electrically or physically couple the electronic device 300 and the external electronic device, and may include a USB connector, an SD card/multimedia card (MMC) connector, or an audio connector.

The at least one PCB 330 may include a first PCB 331 and/or a second PCB 332. The first PCB 331 may be disposed on a region of the support member 322 (e.g., a region in the +y direction of FIG. 3). The second PCB 332 may be disposed on another region of the support member 322 spaced apart from the first PCB 331 (e.g., a region in the −y direction of FIG. 3). The first PCB 331 and the second PCB 332 may be electrically coupled through an electrical connecting member 333. The aforementioned electrical connecting member 333 may include at least one of an FPCB, a coaxial cable, and a board to board (B to B) connector, but is not limited thereto. The at least one PCB 330 is not limited to the structure of the embodiment illustrated on the figure. The at least one PCB 330 may be constructed of one PCB.

The first support structure 340 (or a shield can) may be constructed of a conductive material (e.g., metal) and may be disposed on the at least one PCB 330. A patch antenna may be disposed on at least one region of the first support structure 340 (e.g., a region in the −z direction of FIG. 3). The first support structure 340 may support the aforementioned patch antenna. The aforementioned patch antenna may operate as an antenna radiator which transmits and/or receives an RF signal of a UWB.

The first support structure 340 may shield a plurality of electronic components disposed on the at least one PCB 330. The first support structure 340 may be disposed to surround or cover the plurality of electronic components, thereby blocking noise generated from the plurality of electronic components.

The second support structure 350 (or a rear case) may be constructed of a material different from the first support structure 340. The second support structure 350 may be constructed of a non-conductive material (e.g., plastic), but is not limited thereto. The second support structure 350 may be disposed on a region of the at least one PCB 330 to prevent a plurality of electronic components disposed on at least one region of the at least one PCB 330 and/or to the at least one PCB 330 from being damaged by an external impact. The second support structure 350 may be disposed not to overlap with the first support structure 340, when viewed from an upper end of the at least one PCB 330 (e.g., in −z direction of FIG. 3). The second support structure 350 may be disposed to partially overlap with the first support structure 340.

As a device for supplying power to at least one component of the electronic device 300, the battery 360 may include a non-rechargeable primary cell, a rechargeable secondary cell, or a fuel cell. At least part of the battery 360 may be disposed on substantially the same plane with respect to, the at least one PCB 330. The battery 360 may be disposed integrally inside the electronic device 300, or may be detachably disposed with respect to the electronic device 300.

The back plate 370 may constitute a back face of the electronic device 300. The back plate 370 may prevent internal components of the electronic device 300 from an external impact or entering of a foreign matter.

Figure 4:
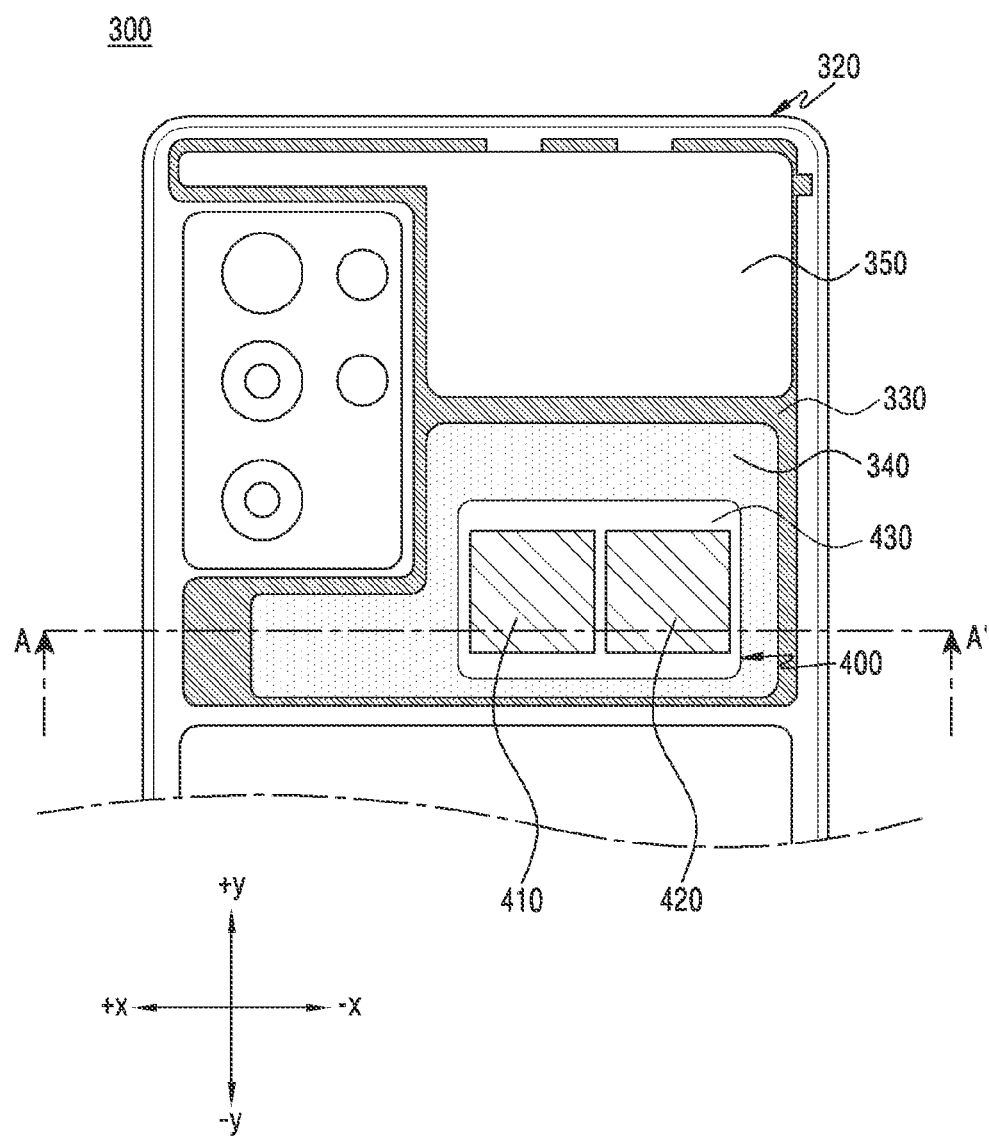
FIG. 4 illustrates a first support structure of an electronic device and a patch antenna disposed on the first support structure, according to an embodiment.

FIG. 4 illustrates a first support structure 340 of an electronic device 300 and a patch antenna 400 disposed on the first support structure 340, according to an embodiment. FIG. 4 is a front view of a side member (e.g., the side member 320 of FIG. 3) of the electronic device of FIG. 3, viewed from one direction e.g., the −z direction of FIG. 3).

Figure 5:
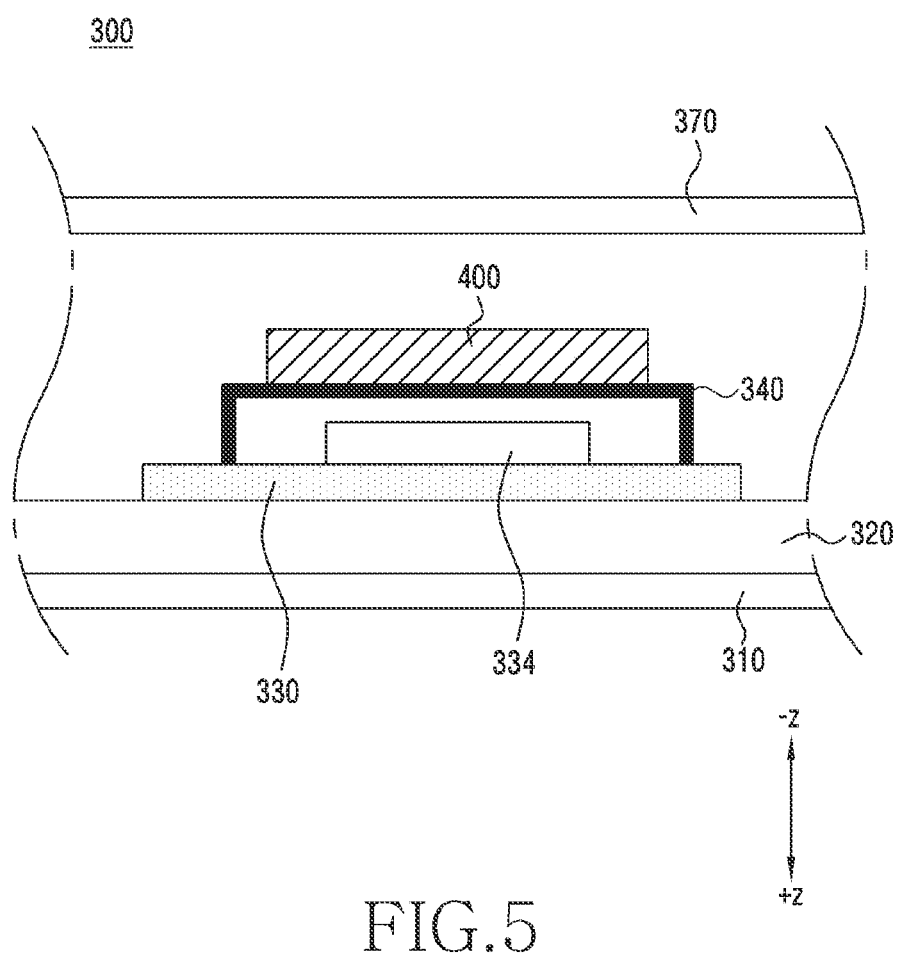
FIG. 5 is a cross-sectional view of the electronic device of FIG. 4, viewed in a direction A-A', according to an embodiment.

FIG. 5 is a cross-sectional view of the electronic device of FIG. 4, viewed in a direction A-A', according to an embodiment.

Referring to FIG. 4 and FIG. 5, an electronic device 300 may include at least one of a display 310, a side member 320, a PCB 330, at least one electronic component 334, a first support structure 340, a second support structure 350, a back plate 370, and/or a patch antenna 400. Among components of the electronic device 300, descriptions on the components provided with reference to FIG. 3 will be omitted.

The side member 320 may provide a space in which the components of the electronic device 300 can be disposed. The PCB 330 may be disposed on a face of the side member 320 (e.g., a face in the −z direction of FIG. 5), and the display 310 may be disposed on another face of the side member 320 (e.g., a face in the +z direction of FIG. 5).

The at least one electronic component 334 may be disposed on at least one region of the PCB 330. The at least one electronic component 334 may include at least one of a camera module, a processor, a signal wiring and/or a wireless communication circuitry.

The first support structure 340 may be constructed of a conductive material (e.g., metal), and may be disposed on at least one region of the PCB 330. The patch antenna 400 may be disposed on a face 340a facing a back plate 370 of the first support structure 340 (e.g., a face in the −z direction of FIG. 5), and the first support structure 340 may support the patch antenna 400. The first support structure 340 may operate as a shield can which shields the at least one electronic component 334 disposed on the PCB 330. The first support structure 340 may shield noise generated from the at least one electronic component 334. The first support structure 340 may operate as a heat dissipation member for discharging heat generated from the at least one electronic component 334 disposed inside the first support structure 340.

A face to which the patch antenna 400 of the first support structure 340 is disposed may be constructed such that at least one region is flat, but is not limited thereto.

The second support structure 350 may be constructed of a non-conductive material (e.g., plastic or polymer) different from the first support structure 340, and may be located between the side member 320 and the back plate 370. The second support structure 350 may be disposed on at least one region of the side member 320 and/or at least one region of the PCB 330 to prevent some regions of the side member 320 and/or PCB 330 from being damaged by an external impact. The second support structure 350 may be disposed not to overlap with the first support structure 340, when the side member 320 is viewed from the back plate 370. However, the disposition of the first support structure 340 and second support structure 350 is not limited to the aforementioned embodiment. The second support structure 350 may be disposed to overlap with some regions of the first support structure 340.

The patch antenna 400 may be disposed on the face 340a facing the back plate 370 of the first support structure 340 (e.g., a face in the −z direction of FIG. 5). The patch antenna 400 may include an FPCB 430, a first conductive patch 410, and a second conductive patch 420. The FPCB 430 may be constructed of a plurality of layers. The FPCB 430 may include a conductive layer for grounding a first conductive patch 410 and/or a second conductive patch 420. The conductive layer for the grounding may be constructed at some or all of any one layer among layers of the FPCB 430. Since the FPCB 430 includes the conductive layer, even if the FPCB 430 is disposed on the conductive first support structure 340, it may be less affected by a conductor. The FPCB 430 may include a dielectric layer disposed between a layer on Which the first conductive patch 410 and/or the second conductive patch 420 are disposed and a layer including a ground.

The first conductive patch 410 and the second conductive patch 420 may be disposed on a face facing the back plate 370 of the FPCB 430 (e.g., a face in the −z direction of FIG. 5). The first conductive patch 410 and the second conductive patch 420 may be disposed on the same face, and the first conductive patch 410 and the second conductive patch 420 may be spaced apart by a specified distance. The first conductive patch 410 and/or second conductive patch 420 of the patch antenna 400 may be electrically coupled with a wireless communication circuitry disposed on the PCB 330 through a signal wiring. Through the aforementioned electrical connection path, the wireless communication circuitry may feed the first conductive patch 410 and/or the second conductive patch 420, and may transmit or receive an RF signal of a specified frequency band. The first conductive patch 410 and the second conductive patch 420 may operate as a radiator which transmits and/or receives an RF signal of a UWB frequency band. The UWB frequency band may be a frequency band of about 6.25 GHz to 8.75 GHz, but is not limited thereto.

Figure 6A:
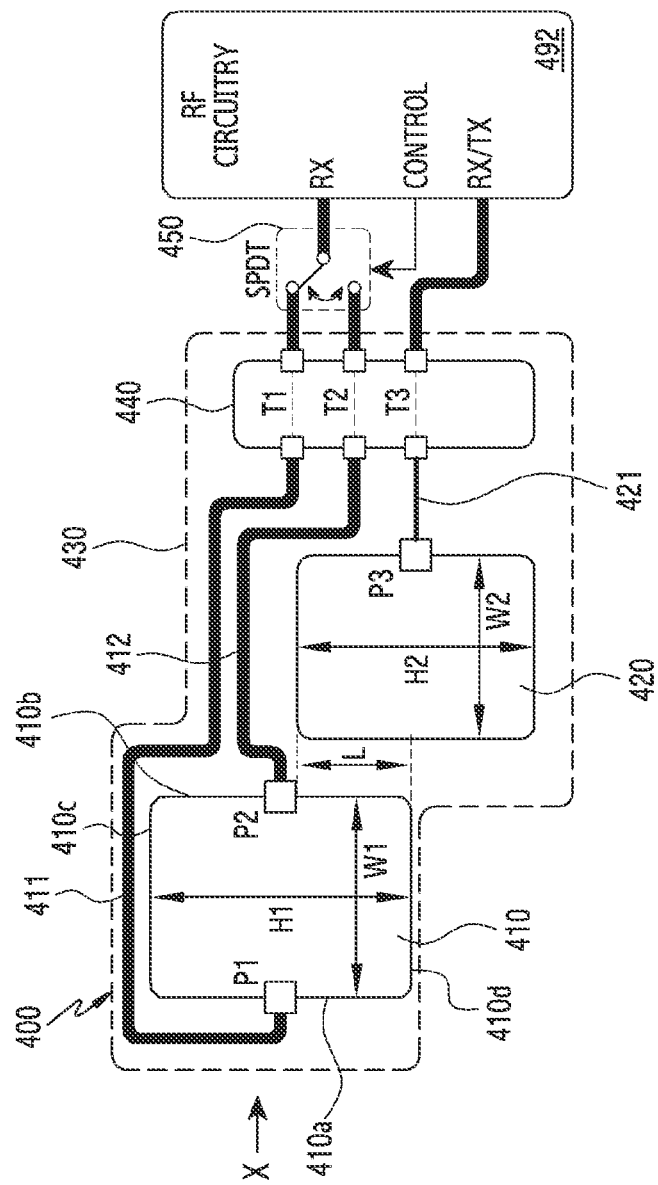
FIG. 6A illustrates a patch antenna and a wireless communication circuitry, according to an embodiment.

FIG. 6A illustrates a patch antenna 400 and a wireless communication circuitry 492, according to an embodiment.

Figure 6B:
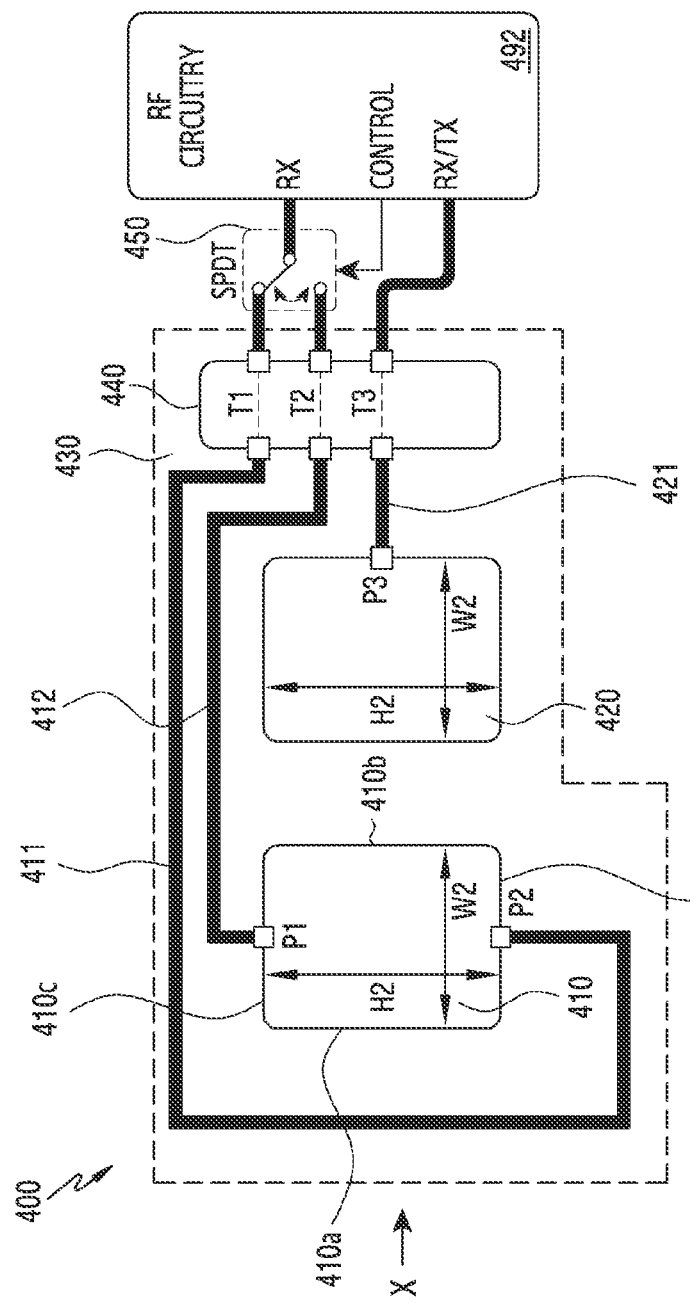
FIG. 6B illustrates the patch antenna and the wireless communication circuitry, according to an embodiment.

FIG. 6B illustrates the patch antenna 400 and the wireless communication circuitry 492, according to an embodiment.

Figure 6C:
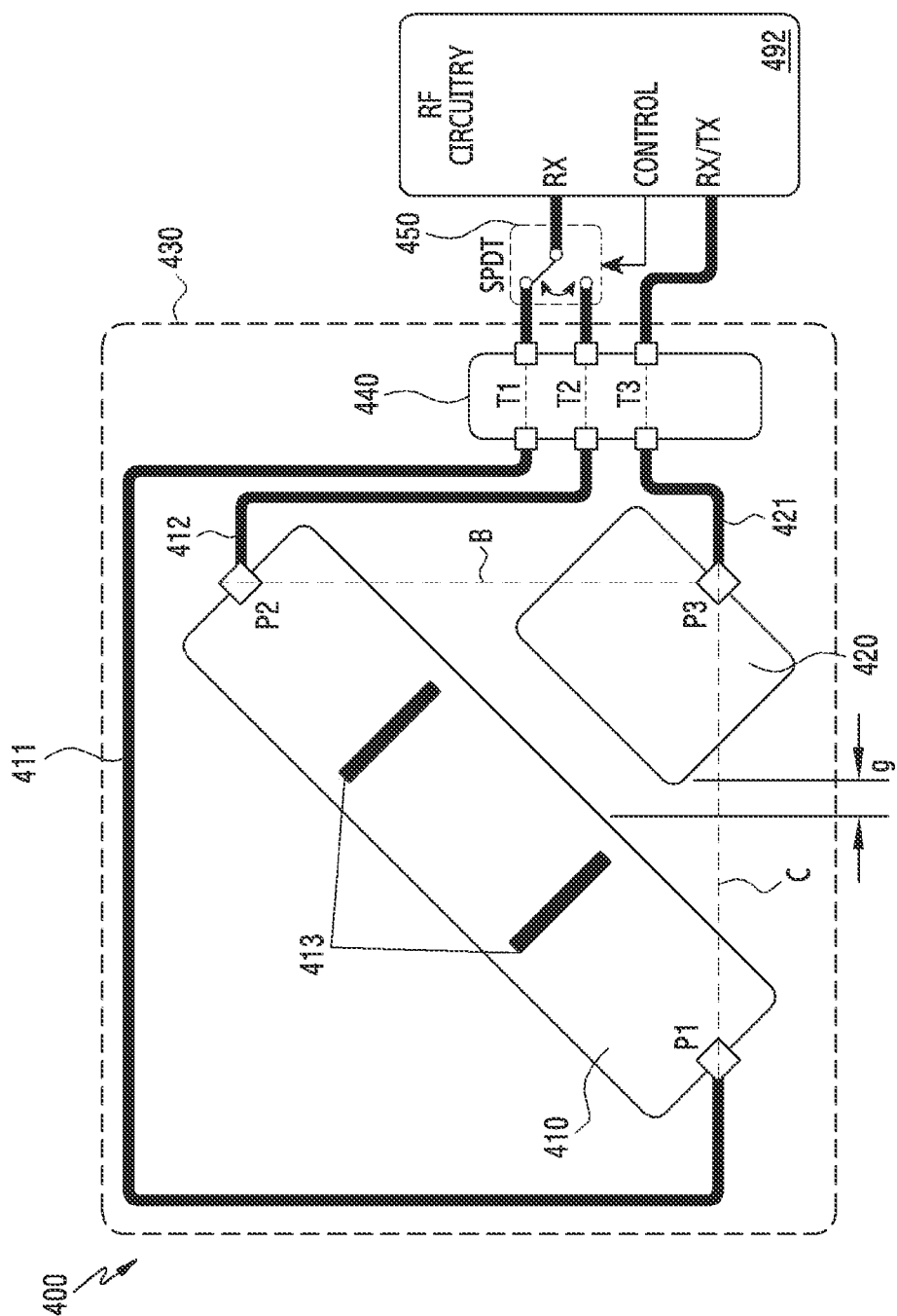
FIG. 6C illustrates the patch antenna and the wireless communication circuitry according to an embodiment.

FIG. 6C illustrates the patch antenna 400 and the wireless communication circuitry 492, according to an embodiment.

Figure 6D:
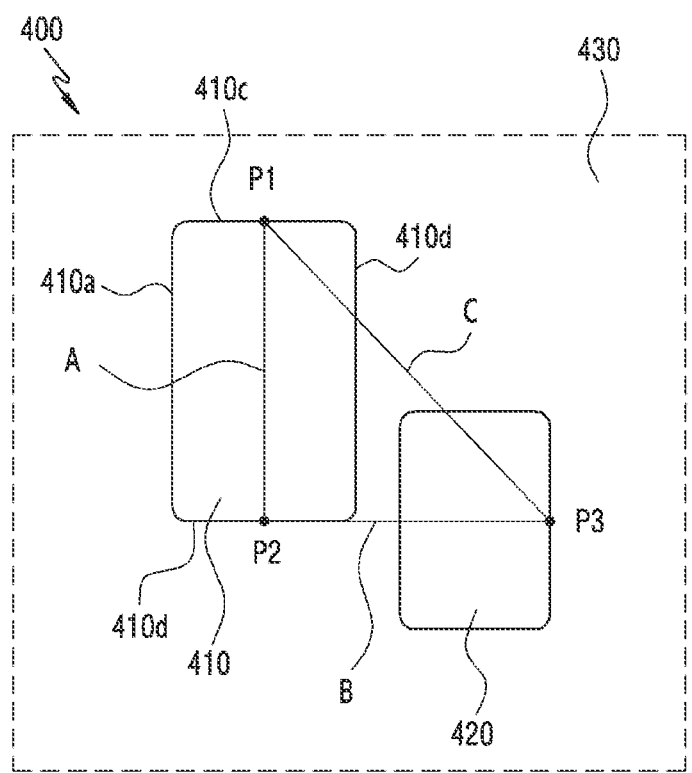
FIG. 6D illustrates a first conductive patch and second conductive patch of the patch antenna, according to an embodiment.

FIG. 6D illustrates a first conductive patch 410 and second conductive patch 420 of the patch antenna 400, according to an embodiment.

Figure 7:
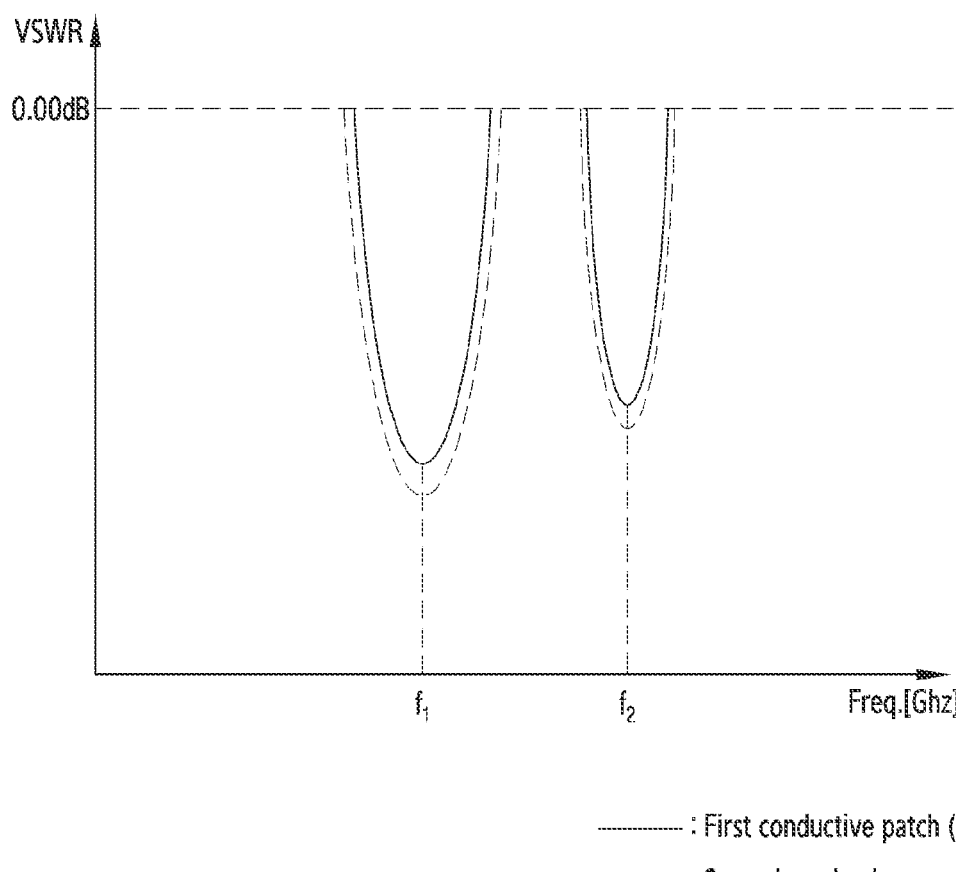
FIG. 7 is a graph illustrating a voltage standing wave ratio (VSWR) of a patch antenna, according to an embodiment.

FIG. 7 is a graph illustrating a VSWR of the patch antenna 400, according to an embodiment.

Referring to FIG. 6A, FIG. 6B, and FIG. 6C, the electronic device 300 may include the patch antenna 400 and the wireless communication circuitry 492.

The patch antenna 400 may include the first conductive patch 410, the second conductive patch 420, and an FPCB 430.

The FPCB 430 may include a first transmission line 411, a second transmission line 412, a third transmission line 421, and a connecting unit 440.

The first transmission line 411 and second transmission line 412 of the FPCB 430 may be coupled to the first conductive patch 410 and the connecting unit 440. Referring to FIG. 6A and FIG. 6C, the first transmission line 411 of the FPCB 430 may be coupled to a first point P1 of the first conductive patch 410 and a first terminal T1 of the connecting unit 440. The second transmission line 412 of the FPCB 430 may be coupled to a second point P2 of the first conductive patch 410 and a second terminal T2 of the connecting unit 440. Referring to FIG. 6B, the first transmission line 411 of the FPCB 430 may be coupled to the second point P2 of the first conductive patch 410 and the first terminal T1 of the connecting unit 440. The second transmission line 412 of the FPCB 430 may be coupled to the first point P1 of the first conductive patch 410 and the second terminal T2 of the connecting unit 440.

The third transmission line 421 of the FPCB 430 may be coupled to a third point P3 of the second conductive patch 420 and a third terminal T3 of the connecting unit 440.

Although it is illustrated in FIG. 6A, FIG. 6B, FIG. 6C, and FIG. 6D that the first conductive patch 410 is fed at two points (e.g., P1 and P2), and the second conductive patch 420 is fed at one point (e.g., P3), the disclosure is not limited thereto. Unlike in FIG. 6A to FIG. 6D, the first conductive patch 410 may be fed at one point, and the second conductive patch 420 may be fed at two points. Both of the first conductive patch 410 and the second conductive patch 420 may be fed at a plurality of points.

The first transmission line 411, the second transmission line 412, and the third transmission line 421 may include a conductive material (e.g., metal). A thickness (or width) of the first transmission line 411 and second transmission line 412 may be substantially identical. As shown in FIG. 6A, the thickness of the third transmission line 421 may be different from the first transmission line 411 and the second transmission line 412. The thickness of the third transmission line 421 may be thinner than the first transmission line 411 and the second transmission line 412. In this case, the first transmission line 411 and/or the second transmission line 412 may have a first thickness, and the third transmission line 421 may have a second thickness less than the first thickness. As shown in FIG. 6B and FIG. 6C, the first transmission line 411, the second transmission line 412, and the third transmission line 421 may have substantially the same thickness (or width).

The connecting unit 440 may be disposed on a face of the FPCB 430 and may be coupled to the PCB 330 of the electronic device 300. The wireless communication circuitry 492 disposed on the PCB 330 of the electronic device 300 may be electrically coupled with the connecting unit 440 of the FPCB 430 through an electrical path provided by the PCB 330. The connecting unit 440 may include a conductive pad or a connector (e.g., a socket or a plug). When the connecting unit 440 includes the conductive pad, the connecting unit 440 may use a fixing means such as soldering to maintain a state of being in contact with the conductive pad provided in the PCB 330, and may be electrically coupled with the wireless communication circuitry 492. When the connecting unit 440 includes the connector, the connector (e.g., plug) of the connecting unit 440 may be joined with a connector (e.g., socket) of the PCB 330, and thus may be electrically coupled with the wireless communication circuitry 492. The wireless communication circuitry 492 may be electrically coupled with the first conductive patch 410 through the first transmission line 411 and the second transmission line 412, and may be electrically coupled with the second conductive patch 420 through the third transmission line 421.

The first conductive patch 410 may be disposed on the FPCB 430. The first conductive patch 410 has a rectangular shape having a specified width and a specified length. The first conductive patch 410 may have a circular, rhombus, or polygonal shape. The first conductive patch 410 may be electrically coupled with the wireless communication circuitry 492 through the first transmission line 411 and the second transmission line 412. Referring to FIG. 6A, the first point P1 of the first conductive patch 410 may be disposed on a first edge 410a among edges of the first conductive patch 410, and the second point P2 of the first conductive patch 410 may be disposed on a second edge 410b facing the first edge 410a and substantially parallel to the first edge 410a. Referring to FIG. 6B and FIG. 6D, the first point P1 may be disposed on a third edge 410c of the first conductive patch 410, and the second point P2 may be disposed on a fourth edge 410d facing the third edge 410c. The first point P1 and the second point P2 are not disposed respectively on the edges facing each other, but may be disposed respectively on edges adjacent to each other. When the first point P1 is disposed on the first edge 410a, the second point P2 may be disposed on the third edge 410c or fourth edge 410d extending in a substantially vertical direction from both ends of the first edge 410a. The first point P1 and the second point P2 may be disposed respectively to different edges among the edges of the first conductive patch 410. The first conductive patch 410 may be fed from the wireless communication circuitry 492 at the first point P1 or the second point P2.

The second conductive patch 420 may be disposed on the FPCB 430. The second conductive patch 420 may be spaced apart from the first conductive patch 410. Referring to FIG. 6C, the second conductive patch 420 may be spaced apart by a specified distance g from the first conductive patch 410. Since the second conductive patch 420 is spaced apart from the first conductive patch 410, an isolation between the second conductive patch 420 and the first conductive patch 410 may be improved.

The second conductive patch 420 may have a rectangular shape having a width W2 and a length H2. The second conductive patch 420 may have a circular, rhombus, or polygonal shape.

An area of the second conductive patch 420 may be smaller than an area of the first conductive patch 410. Referring to FIG. 6A, the length H2 of the second conductive patch 420 may be less than a length H1 of the first conductive patch 410. In addition, the width W2 of the second conductive patch 420 may be less than a width W1 of the first conductive patch 410. The area of the first conductive patch 410 may be substantially identical to the area of the second conductive patch 420. Referring to FIG. 6B, the length H2 and width W2 of the first conductive patch 410 may be substantially identical to those of the second conductive patch 420. The length and width of the first conductive patch 410 may be different from those of the second conductive patch 420, but the areas thereof may be substantially identical.

The second conductive patch 420 may be electrically coupled with the wireless communication circuitry 492 through the third transmission line 421. The third point P3 of the second conductive patch 420 may be disposed on any one edge among the edges of the second conductive patch 420. An increase in the distance of the third point P3 from the first point P1 and/or the second point P2 may result in an improvement in an isolation between the first conductive patch 410 and the second conductive patch 420. The third point P3 of the second conductive patch 420 may be disposed on an edge farthest from the first point P1 and/or the second point P2 among the edges of the second conductive patch 420. The second conductive patch 420 may be fed from the wireless communication circuitry 492 at the third point P3.

A virtual first line segment (e.g., a line segment C of FIG. 6D) which connects the first point P1 and the third point P3, a virtual second line segment (e.g., a line segment B of FIG. 6D) which connects the second point P2 and the third point P3, and a virtual third line segment (e.g., a line segment A of FIG. 6D) which connects the first point P1 and the second point P2 may be constructed. The first point P1, the second point P2, and the third point P3 may be disposed such that the first line segment and the second line segment are not parallel to each other.

Referring to FIG. 6C, the virtual first line segment C which connects the first point P1 and the third point P3 may be substantially perpendicular to the virtual second line segment B which connects the second point P2 and the third point P3. In this case, the first conductive patch 410 may be longer in a lengthwise direction than the second conductive patch 420, and the area of the first conductive patch 410 may be greater than that of the second conductive patch 420. Since a distance between the first point P1 and the second point P2 of FIG. 6C is farther than that of the first conductive patch 410 of FIG. 6A, FIG. 6B, and FIG. 6D, a shorting via 413 may be disposed to separate an antenna region of the first conductive patch 410 between the first conductive patch 410 and the second conductive patch 420. The first conductive patch 410 and the second conductive patch 420 may be aligned in a diagonal direction on the FPCB 430, based on a state where the patch antenna 400 is disposed on the electronic device. That is, unlike in FIG. 4 in which the first conductive patch 410 and the second conductive patch 420 are disposed in the same direction as the side member 320 of the electronic device 300, the first conductive patch 410 and the second conductive patch 420 of FIG. 6C may be disposed not to parallel in a lengthwise direction of a housing of the electronic device (e.g., the side member 320 of FIG. 4). In this case, the first virtual line segment C may be substantially perpendicular to a first edge of the electronic device (e.g., a first side face 900*a* or second side face 900*b* of FIG. 16A), and may be substantially parallel to a second edge (e.g., a third side face 900*c* or fourth side face 900*d* of FIG. 16A) perpendicular to the first edge. The virtual second line segment B may be substantially parallel to the first edge of the electronic device (e.g., the first side face 900*a* or second side face 900*b* of FIG. 16A), and may be substantially perpendicular to the second edge (e.g., the third side face 900*c* or fourth side face 900*d* of FIG. 16A).

Referring to FIG. 6D, the first point P1, the second point P2, and the third point P3 may be disposed such that the line segment A and the line segment B are substantially perpendicular to each other, and the line segment B and the line segment C are not parallel to each other. A distance between the third point P3 of the second conductive patch 420 and the second point P2 of the first conductive patch 410 may be a first distance. A distance between the third point P3 of the second conductive patch 420 and the first point P1 of the first conductive patch 410 may be a second distance greater than or equal to the first distance. Referring to FIG. 6A, the second distance between the first point P1 and the third point P3 may be greater than the first distance between the second point P2 and the third point P3. Referring to FIG. 6B, the second distance between the first point P1 and the third point P3 may be substantially identical to the first distance between the second point P2 and the third point P3. The first distance and the second distance may be less than or equal to a specified distance (e.g., a half wavelength λ/2 of a signal to be received through the patch antenna 400). When the first distance and the second distance exceed the half wavelength λ/2 of the signal to be received through the patch antenna 400, performance of location measurement using the patch antenna 400 may deteriorate. The specified distance may be greater than or equal to 10 mm and less than or equal to about 30 mm, but is not limited thereto.

The first conductive patch 410 and the second conductive patch 420 may be disposed to overlap at least partially on a horizontal axis of the FPCB 430 (e.g., direction X). Referring to FIG. 6A, the second conductive patch 420 is spaced apart from the first conductive patch 410, but when the patch antenna 400 is viewed from a side face (e.g., direction X), the second conductive patch 420 may be disposed to overlap by a specified length L with the first conductive patch 410. The specified length L may be less than or equal to the length H2 of the second conductive patch 420 and greater than or equal to half the length H2/2 of the second conductive patch 420. Referring to FIG. 6B, the first conductive patch 410 and the second conductive patch 420 may be disposed along the direction X on the FPCB 430, and when the patch antenna 400 is viewed in the direction X, the first conductive patch 410 may entirely overlap with the second conductive patch 420.

The wireless communication circuitry 492 may feed to the first point P1 or second point P2 of the first conductive patch 410 by using a switch circuitry 450. The wireless communication circuitry 492 may transmit a control signal to the switch circuitry 450 to select an RF signal path, and may feed to the selected RF signal path. The switch circuitry 450 may include a single pole double throw (SPDT) switch.

The first conductive patch 410 which is physically one construction may operate as two antenna elements through a structure of feeding to the first point P1 or the second point P2 by using the switch circuitry 450. The first conductive patch 410 may operate as a first antenna element which is fed at the first point P1 or a second antenna element which is fed at the second point P2. The first antenna element and second antenna element of the first conductive patch 410 may output different beam patterns.

A receive (RX) port of the wireless communication circuitry 492 may be electrically coupled with the first conductive patch 410 through the switch circuitry 450. The first conductive patch 410 may operate as two antenna elements for receiving an RF signal of a specified band through a structure of feeding to the first point P1 or the second point P2. The wireless communication circuitry 492 may receive the RF signal of the specified band, by using the first conductive patch 410 coupled to the first point P1 through the switch circuitry 450. The wireless communication circuitry 492 may receive the RF signal of the specified band, by using the first conductive patch 410 coupled to the second point P2 through the switch circuitry 450.

An RX/transmit (TX) port of the wireless communication circuitry 492 may be electrically coupled with the second conductive patch 420. The wireless communication circuitry 492 may receive or transmit an RF signal of a specified band, by using the second conductive patch 420 fed at the third point P3.

A control port of the wireless communication circuitry 492 may be electrically coupled with the switch circuitry 450. The wireless communication circuitry 492 may provide a control signal for selecting the first point P1 or second point P2 of the first conductive patch 410 to the switch circuitry 450 through the control port.

The patch antenna 400 may have a multi-resonance characteristic. Referring to FIG. 7, the first conductive patch 410 may resonate in a first frequency range having a first center frequency $f_1$ (e.g., 6.5 GHz) and a second center frequency $f_2$ (e.g., 8.2 GHz), and the second conductive patch 420 may also resonate in a frequency range having the first center frequency $f_1$ and a frequency range having the second center frequency $f_2$.

Figure 8A:
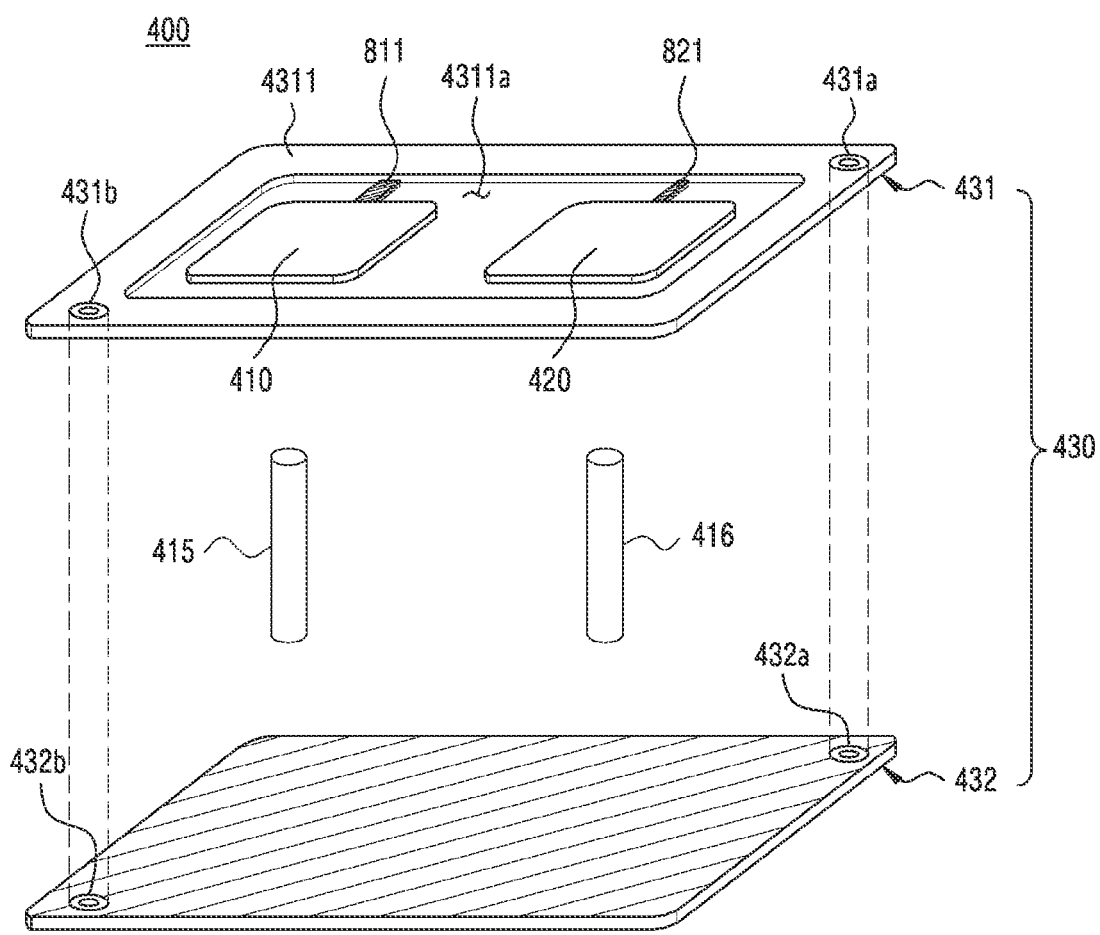
FIG. 8A is an exploded perspective view of a patch antenna of an electronic device, according to an embodiment.

FIG. 8A is an exploded perspective view of a patch antenna 400 of an electronic device, according to an embodiment.

Figure 8B:
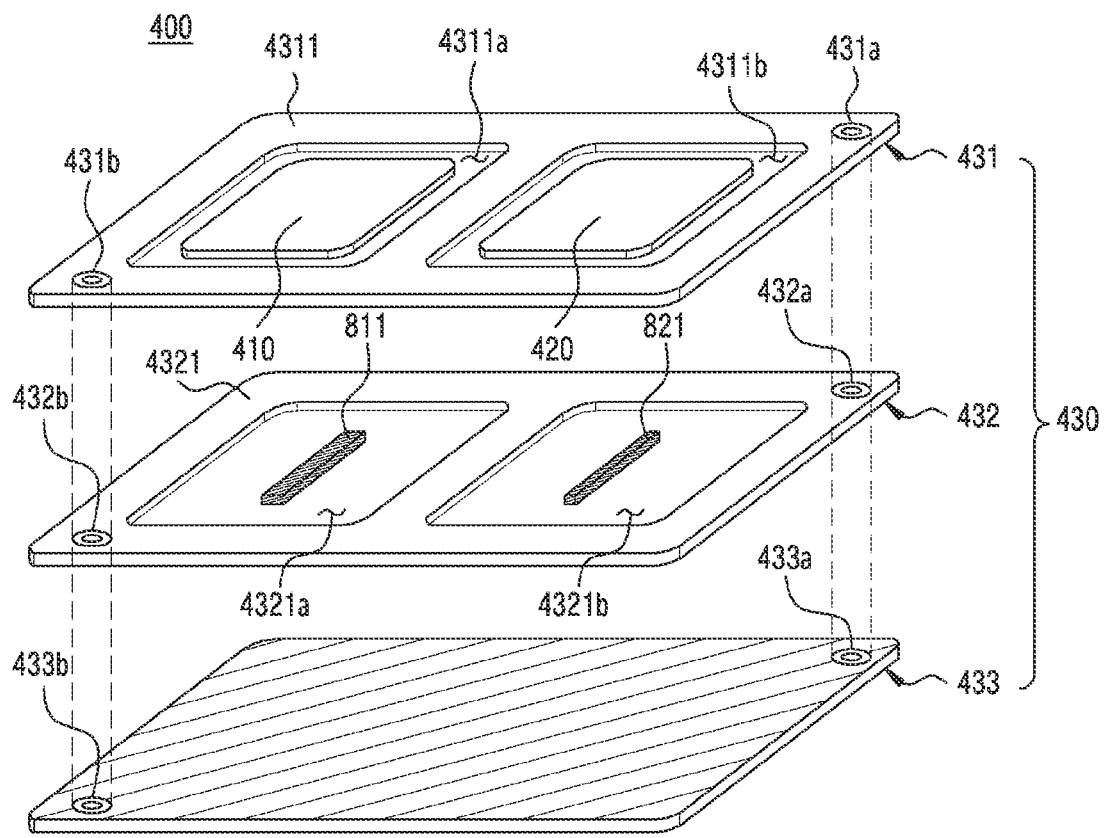
FIG. 8B is an exploded perspective view of the patch antenna of an electronic device, according to an embodiment.

FIG. 8B is an exploded perspective view of the patch antenna 400 of the electronic device, according to an embodiment.

FIG. 8A and FIG. 8B illustrate a structure of the patch antenna 400 of the electronic device 300 of FIG. 4 and FIG. 5.

Referring to FIG. 8A and FIG. 8B, the patch antenna 400 of the electronic device 300 may include an FPCB 430, a first conductive patch 410, a second conductive patch 420, a first transmission line 811, and a second transmission line 821.

Referring to FIG. 8A, the FPCB 430 may include a plurality of layers. The FPCB 430 may include a first layer 431 and a second layer 432 located at a bottom end of the first layer 431 (e.g., direction Y).

The first conductive patch 410, the second conductive patch 420 spaced apart from the first conductive patch 410, the first transmission line 811, and the second transmission line 821 may be disposed on the first layer 431 of the FPCB 430. The first conductive patch 410 may be electrically coupled with a wireless communication circuitry through the first transmission line 811. The first transmission line 811 may include a plurality of transmission lines. As shown in FIG. 6A, it may include two transmission lines (e.g., the first transmission line 411 and second transmission line 412 of FIG. 6A) respectively coupled to different two edges of the first conductive patch 410. The second conductive patch 420 may be electrically coupled with the wireless communication circuitry through the second conductive patch 420. Although it is illustrated in FIG. 8A and FIG. 8B that the first transmission line 811 and the second transmission line 812 have different widths, each of the widths of the first transmission line 811 and second transmission line 821 is not limited to the illustrated example. As shown in FIG. 6B, the first transmission line 811 (e.g., the first transmission line 411 and/or second transmission line 412 of FIG. 6B) may have substantially the same width as the second transmission line 821 (e.g., the third transmission line 421 of FIG. 6B).

A location where the first transmission line 811 and/or the second transmission line 821 are disposed is not limited to the illustrated embodiment. The location where the first transmission line 811 and/or the second transmission line 821 are disposed may vary depending on an embodiment.

The FPCB 430 may include electrical connecting members 415 and 416 to electrically couple the first conductive patch 410 and/or second conductive patch 420 of the first layer 431 and a ground of the second layer 432. The electrical connecting members 415 and 416 may include the first electrical connecting member 415 which electrically couples the first conductive patch 410 of the first layer 431 and the ground of the second layer 432 and the second electrical connecting member 416 which electrically couples the second conductive patch 420 of the first layer 431 and the ground of the second layer 432. Through the first electrical connecting member 415 and/or the second electrical connecting member 416, a current flow of the first conductive patch 410 and/or second conductive patch 420 may be changed, which may result in a change in a resonance characteristic of the first conductive patch 410 and/or second conductive patch 420. The first electrical connecting member 415 and/or the second electrical connecting member 416 may have a structure in which a plurality of conductive vias are aligned in a wall shape. The first electrical connecting member 415 and/or the second electrical connecting member 416 may be a conductive via of a wall shape, but are not limited thereto. The first electrical connecting member 415 and/or the second electrical connecting member 416 may include a signal wiring, a conductive gasket, a conductive foam, and/or a C-clip.

A guard ground 4311 including at least one hole 4311a may be disposed on the first layer 431 of the FPCB 430. The guard ground 4311 may be disposed to surround at least one of the first conductive patch 410, second conductive patch 420, first transmission line 811, and/or second transmission line 821 disposed on the first layer 431. Since at least one of the first conductive patch 410, the second conductive patch 420, the first transmission line 811, and/or the second transmission line 821 is disposed inside at least one hole 4311a of the guard ground 4311, the guard ground 4311 may surround at least one of the first conductive patch 410, the second conductive patch 420, the first transmission line 811, and/or the second transmission line 821. The guard ground 4311 may shield at least one of the first conductive patch 410, the second conductive patch 420, the first transmission line 811, and/or the second transmission line 821. The guard ground 4311 may shield at least one of the first conductive patch 410, the second conductive patch 420, the first transmission line 811, and/or the second transmission line 821 from noise generated from other electronic components in the electronic device 300.

The second layer 432 (or a ground layer) of the FPCB 430 may include a ground. Coupling (or a capacitive coupling) may occur between the ground of the second layer 432 and the first and second transmission lines 811 and 821 of the first layer 431. A dielectric material having a specified permittivity may be filled between the first layer 431 and second layer 432 of the FPCB 430. The resonance characteristic of the first conductive patch 410 and/or second conductive patch 420 operating as an antenna radiator may vary depending on a thickness of the dielectric material disposed between the first layer 431 and the second layer 432. An increase in the thickness of the dielectric material may result in an increase in a coupling space between the first conductive patch 410 and the second conductive patch and the ground of the second layer 432. Accordingly, an antenna efficiency (e.g., an antenna gain) of the first conductive patch 410 and the second conductive patch 420 may be improved.

The first layer 431 and second layer 432 of the FPCB 430 may be electrically coupled through at least one via penetrating the guard ground 4311 and including a conductive material. At least one of first through-holes (or via holes) 431a and 431b may be disposed on the guard ground 4311 of the first layer 431, and at least one of second through-holes 432a and 432b of the second layer 432 may be disposed at locations corresponding to the at least one of first through-holes 431a and 431b of the first layer 431. Since the at least one via is disposed inside the at least one of the first through-holes 431a and 431b of the first layer 431 and the at least one of the second through-holes 432a and 432b of the second layer 432, the first layer 431 and the second layer 432 may be electrically coupled.

A cover lay may be disposed at an upper end of the first layer 431 of the FPCB 430 (e.g., a region in direction X) and/or a lower end of the second layer 432 (e.g., a region in direction Y). The cover lay may protect the first layer 431 and second layer 432 of the FPCB 430.

Referring to FIG. 8B, the FPCB 430 may include the first layer 431, the second layer 432 located at a bottom end of the first layer 431 (e.g., direction Y), and a third layer 433 located at a bottom end of the second layer 432 (e.g., direction Y).

The first conductive patch 410 and the second conductive patch 420 spaced apart by a specified distance from the first conductive patch 410 may be disposed on the first layer 431 of the FPCB 430. The first guard ground 4311 including at least one of holes 4311a and 4311b may be disposed on the first layer 431 of the FPCB 430. The first guard ground 4311 may be disposed to surround the first conductive patch 410 and second conductive patch 420 of the first layer 431. The first conductive patch 410 may be disposed inside the first hole 4311a of the first guard ground 4311, and the second conductive patch 420 may be disposed inside the second hole 4311b of the first guard ground 4311, so that the first guard ground 4311 is disposed to surround the first conductive patch 410 and the second conductive patch 420. The first guard ground 4311 may shield the first conductive patch 410 and the second conductive patch 420 from external noise.

The first transmission line 811 and the second transmission line 821 may be disposed on the second layer 432 of the FPCB 430. The first conductive patch 410 may be electrically coupled with a wireless communication circuitry through the first transmission line 811. The second conductive patch 420 may be electrically coupled with the wireless communication circuitry through the second transmission line 821. At least one connecting member which electrically couples the first conductive patch 410 and/or the second conductive patch 420 to a ground of the third layer 433 may be further included in the second layer 432 of the FPCB 430.

A second guard ground 4321 including at least one of holes 4321a and 4321b may be additionally disposed on the second layer 432 of the FPCB 430. The second guard ground 4321 may be disposed to surround the first and second transmission lines 811 and 821, thereby shielding the first and second transmission lines 811 and 821 from external noise. The first transmission line 811 may be disposed inside the third hole 4321a of the second guard ground 4321, and the second transmission line 821 may be disposed inside the fourth hole 4321b of the second guard ground 4321, so that the second guard ground 4321 is disposed to surround the first transmission line 811 and the second transmission line 821. A location where the first transmission line 811 and/or the second transmission line 821 are disposed is not limited to the illustrated embodiment. The location where the first transmission line 811 and/or the second transmission line 821 are disposed may vary depending on an embodiment.

The third layer 433 (or the ground layer) of the FPCB 430 may include a ground. Coupling (i.e., capacitive coupling) may occur between the ground of the third layer 433 and the first and second transmission lines 811 and 821 of the second layer 432.

The first layer 431, the second layer 432, and/or third layer 433 of the FPCB 430 may be electrically coupled through at least one via including a conductive material. At least one of the first through-hole (or via holes) 431a and 431b may be disposed on the guard ground 4311 of the first layer 431. At least one of the second through-holes 432a and 432b may be disposed at locations corresponding to the at least one of the first through-holes 431a and 431b of the first layer 431, and at least one of third through-holes 433a and 433b of the third layer 433 may be disposed at locations corresponding to the at least one of the second through-holes 432a and 432b of the second layer 432. Since the at least one via is disposed inside the at least one of the first through-holes 431a and 431b of the first layer 431, the at least one of the second through-hole 432a and 432b of the second layer 432, and/or the at least one of the third through-holes 433a and 433b of the third layer 433, the first layer 431, the second layer 432, and/or the third layer 433 can be electrically coupled.

A dielectric material having a specified permittivity may be filled between the first layer 431 and second layer 432 of the FPCB 430 and between the second layer 432 and the third layer 433. A cover lay may be disposed at an upper end of the first layer 431 of the FPCB 430 (e.g., a region in direction X) and/or a lower end of the third layer 433 (e.g., a region in direction Y). The cover lay may protect the first layer 431, second layer 432, and/or third layer 433 of the FPCB 430.

Figure 9:
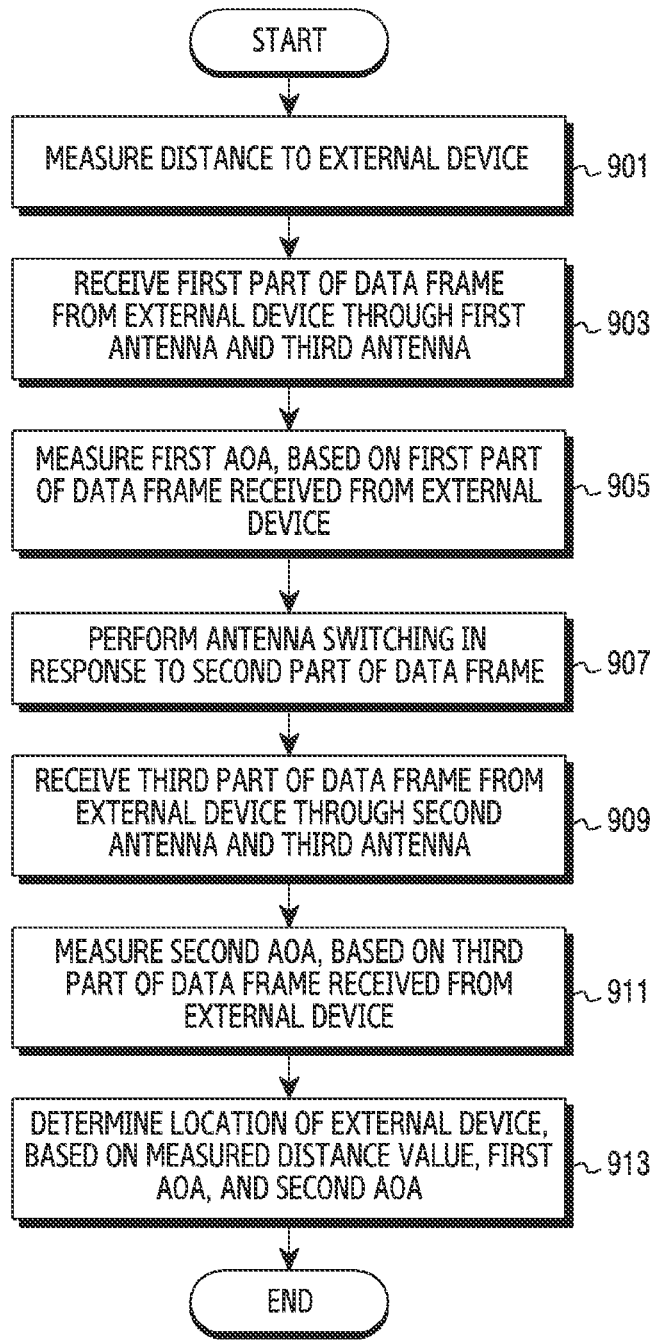
FIG. 9 is a flowchart illustrating an operation in which an electronic device detects a location of an external device, according to an embodiment.

FIG. 9 is a flowchart illustrating an operation in which an electronic device 900 detects a location of an external device 902m according to an embodiment.

Figure 10:
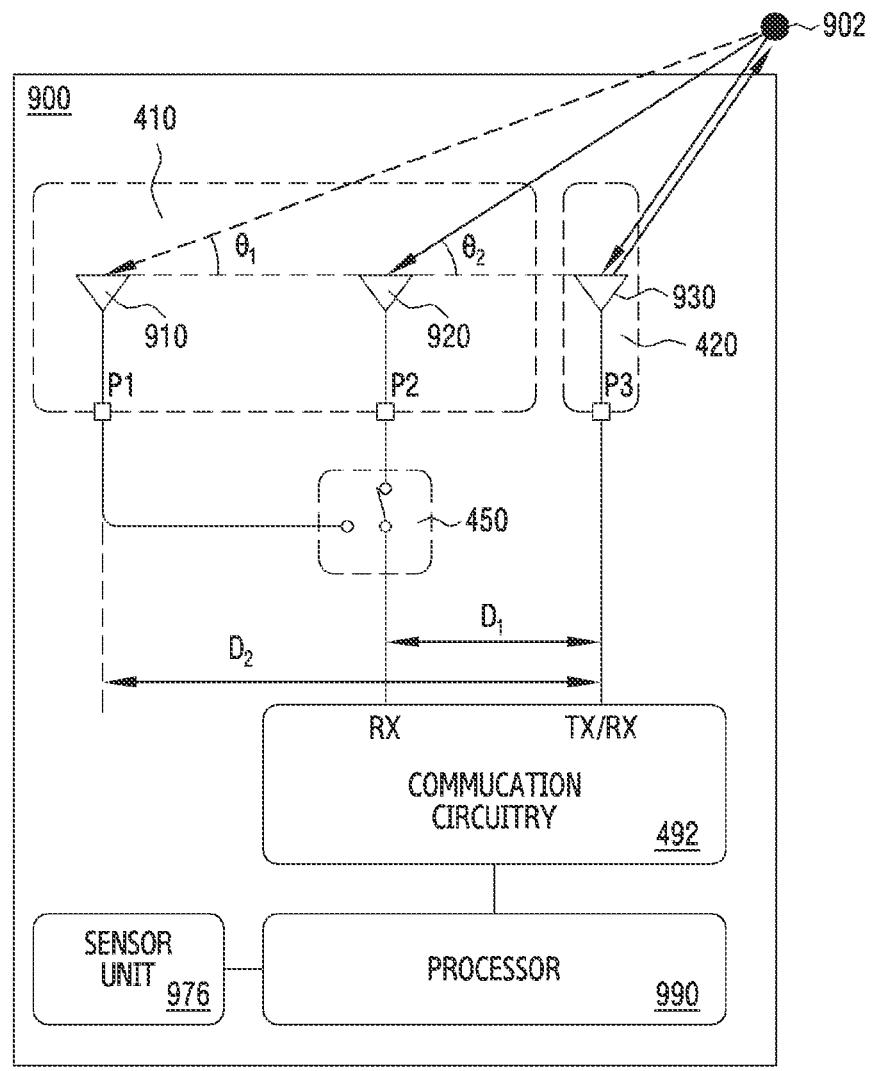
FIG. 10 is a conceptual view illustrating an operation in which an electronic device detects a location of an external device, according to an embodiment.

FIG. 10 is a conceptual view illustrating an operation in which the electronic device 900 detects a location of the external device 902, according to an embodiment.

When components have the same reference numerals as those of the electronic device 300 described above, the aforementioned description may be equally applied to the electronic device 900 of FIG. 10.

Figure 11:
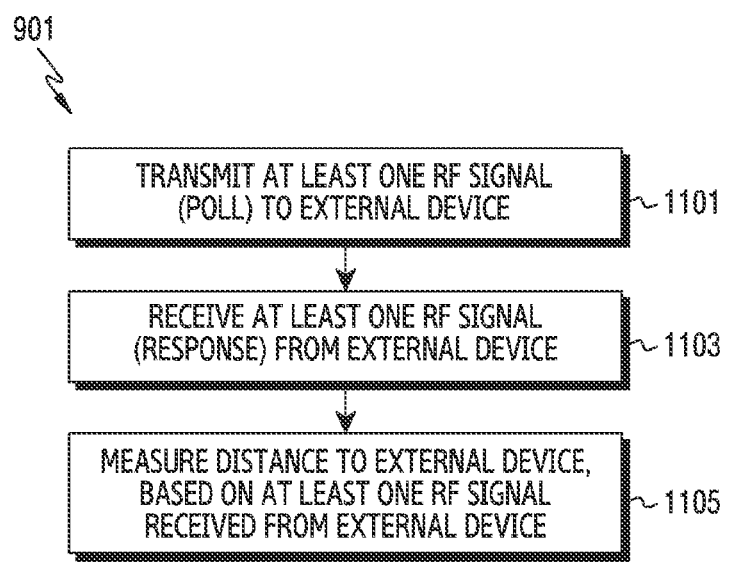
FIG. 11 is a detailed flowchart illustrating step 901 of FIG. 9, according to an embodiment.

FIG. 11 is a detailed flowchart illustrating step 901 of FIG. 9, according to an embodiment.

Figure 12:
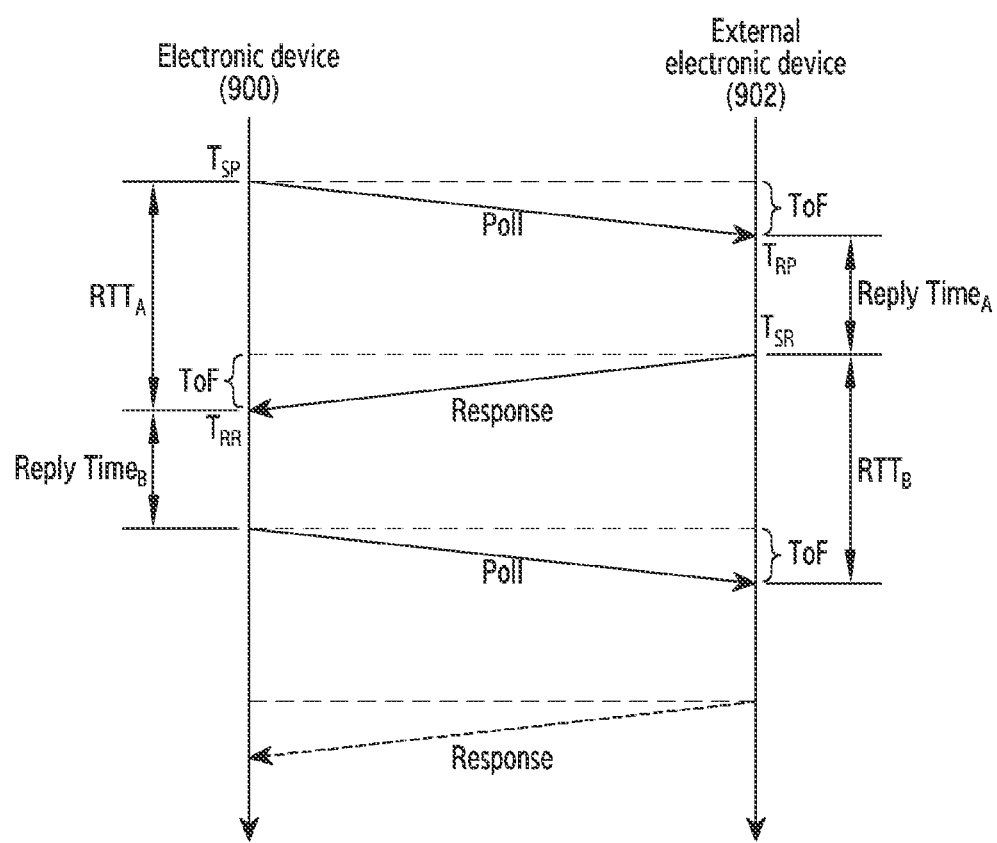
FIG. 12 illustrates a ranging processor of an electronic device with respect to an external device, according to an embodiment.

FIG. 12 illustrates a ranging process of the electronic device 900 with respect to the external device 902, according to an embodiment.

Figure 13:
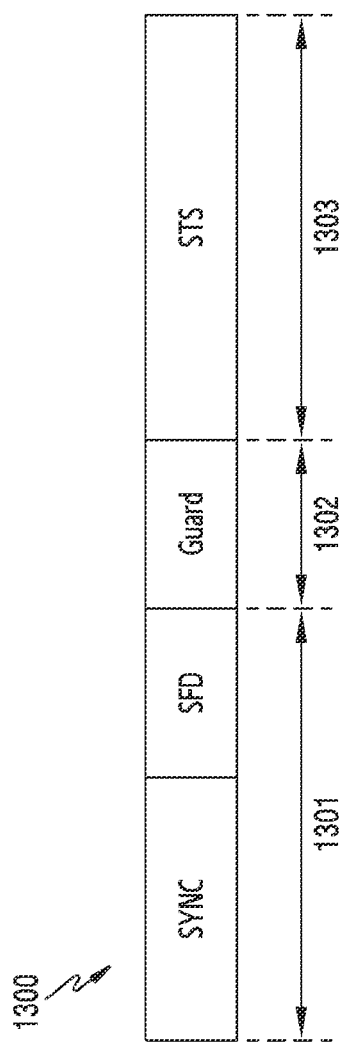
FIG. 13 illustrates a data frame of UWB communication, according to an embodiment.

FIG. 13 illustrates a data frame of UWB communication, according to an embodiment.

Steps of FIG. 9 may be performed in sequence or in parallel. The steps illustrated in FIG. 9 may be performed in sequence from step 901 to step 913. As another example, step 901 may be performed simultaneously with steps 903 to step 911, or step 903 to step 911 may be performed during the performance of step 901.

The steps illustrated in FIG. 9 may be performed by the electronic device 900 of FIG. 10 or the processor 990 of the electronic device 900.

Hereinafter, an operation in which the electronic device 900 detects the location of the external device 902 will be described with reference to FIG. 10, FIG. 11, FIG. 12, and FIG. 13.

First, referring to FIG. 10, a first conductive patch 410 electrically coupled with a wireless communication circuitry 492 at a first point P1 through a switch circuitry 450 may operate as a first antenna 910. The first conductive patch 410 electrically coupled with the wireless communication circuitry 492 at a second point P2 through the switch circuitry 450 may operate as a second antenna 920. A second conductive patch 420 electrically coupled with the wireless communication circuitry 492 at a third point P3 may operate as a third antenna 930.

An RX port of the wireless communication circuitry 492 may be electrically coupled with the first conductive patch 410 through the switch circuitry 450, and a TX/RX port of the wireless communication circuitry 492 may be electrically coupled with the second conductive patch 420. The first conductive patch 410 may operate as an antenna (e.g., the first antenna 910 and the second antenna 920) for receiving an RF signal of a specified band (e.g., UWB), and may operate as an antenna for measuring an angle of arrival of an RF signal received from the external device 902. The second conductive patch 420 may operate as an antenna (e.g., the third antenna 930) for transmitting and receiving the RF signal of the specified band, may operate as an antenna for measuring a distance to the external device 902, and may operate as an antenna for measuring an angle of arrival of an RF signal received from the external device 902.

The electronic device 900 may include a sensor unit 976 electrically coupled with a processor 990. The sensor unit 976 may include at least one sensor. The sensor unit 976 may include a magnetic field sensor (or a geomagnetic sensor) and/or a GNSS (e.g., a global positioning system (GPS)).

Referring to FIG. 9, at step 901, the electronic device 900 may measure a distance to the external device 902. A two way ranging (TWR) scheme may be used to measure the distance. Referring to FIG. 11 as a detailed flowchart of the step 901 of FIG. 9, at step 1101, the electronic device 900 may transmit at least one RF signal (poll) to the external device 902. Referring to FIG. 10 and FIG. 12, the processor 990 of the electronic device 900 may transmit a ranging request message (or a poll message) to the external device 902 by using the third antenna 930. The external device 902 which has received the at least one ranging request message may transmit at least one ranging response message (or a response message) to the electronic device 900.

At step 1103, the electronic device 900 may receive at least one RF signal (response) from the external device 902. Referring to FIG. 10 and FIG. 12, the processor 990 of the electronic device 900 may receive the at least one ranging response message by using at least one of the first antenna 910, the second antenna 920, and/or the third antenna 930.

At step 1105, the electronic device 900 may measure a distance to the external device 902, based on at least one RF signal received from the external device 902. Referring to FIG. 12, the processor 990 may determine a round trip time (RTT) (e.g., $RTT_A$), based on a timing at which the ranging request message is transmitted and a timing at which the ranging response message is received. The processor 990 may subtract, from the RTT, a time (e.g., Reply Time$_A$) required the external device 902 transmits the ranging response message after receiving the ranging request message, and thus may determine a time of flight (TOF) which is a time required until an RF signal is transmitted from the electronic device 900 and arrives up to the external device 902. The processor 990 may measure the distance to the external device 902, based on the determined TOF.

Returning to FIG. 9, at step 903, the electronic device 900 may receive a first part of a data frame from the external device 902 through the first antenna 910 and the third antenna 930. Referring to FIG. 10 and FIG. 13, the processor 990 may use the wireless communication circuitry 492 to provide control such that the switch circuitry 450 is coupled at the first point P1 of the first conductive patch 410. The processor 990 may use the first antenna 910 and the third antenna 930 to receive a first part 1301 including a synchronization (SYNC) packet and start of frame delimiter (SFD) packet of a data frame 1300 from the external device 902. At least one ranging response message received from the external device 902 may include one data frame 1300 including a plurality of packets of a format configured based on a UWB communication protocol. That is, since the data frame 1300 may be included in the at least one ranging response message received from the external device 902 described at step 1103, step 903 in which the first part 1301 of the data frame 1300 is received may be performed simultaneously with step 1103 in which at least one RF signal (or response) is received from the external device or during step 1103 is performed. The data frame 1300 may include the SYNC packet 1301 including time synchronization information with respect to the external device 902, the SFD packet 1301 for indicating an end of the SYNC packet, a guard packet 1302 as a time gap in which no signal is transmitted/received, and a scrambled timestamp sequence (STS) packet 1303 for preventing an attack on data included in the data frame 1300. A state where the first conductive patch 410 is electrically coupled with the wireless communication circuitry 492 at the first point P1 may be referred to as a state where the first antenna 910 is active and a state where the second antenna 920 is inactive. The state where the first conductive patch 410 is electrically coupled with the wireless communication circuitry 492 at the second point P2 may be referred to as a state where the first antenna 910 is inactive or a state where the second antenna 920 is active.

At step 905, the electronic device 900 may measure a first AOA, based on the first part 1301 of the data frame 1300 received from the external device 902. Referring to FIG. 10, the processor 990 may determine a phase difference between a signal received through the first antenna 910 and a signal received through the third antenna 930, based on a difference of respective timings at which an RF signal corresponding to the first part 1301 of the data frame 1300 is received through the first antenna 910 and the third antenna 930. The processor 990 may determine a first AOA $\theta_1$ of an RF signal received from the external device 902, based on the determined phase difference, a wavelength of the received RF signal, and a distance 910 between the first antenna 910 and the third antenna 930. The processor 990 may compare the received SYNC packet and a cross-correlation with a stored SYNC sequence to calculate a channel impulse response (CIR). The processor 990 may obtain time stamp information from the SYNC packet and SFD packet corresponding to the first part 1301 of the data frame 1300, based on the calculated CIR, thereby determining the first AOA $\theta_1$.

At step 907, the electronic device 900 may perform antenna switching, based on the second part 1302 of the data frame 1300. Referring to FIG. 10 and FIG. 13, the processor 990 may receive the second part 1302 of the data frame 1300 through at least one of the first antenna 910 and/or the third antenna 930 in response to a time division operation of UWB communication. The processor 990 may control the switch circuitry 450 such that the first conductive patch 410 coupled to the first point P1 is coupled to the second point P2 at a time corresponding to the second part 1302 of the data frame 1300. The processor 990 may change a state of the first antenna 910 from an active state to an inactive state, and may change a state of the second antenna 920 from the inactive state to the active state.

At step 909, the electronic device 900 may receive a third part 1303 of the data frame 1300 from the external device 902 through the second antenna 920 and the third antenna 930. Referring to FIG. 13, the processor 990 may use the second antenna 920 and the third antenna 930 to receive the third part 1303 including the STS packet of the data frame 1300 from the external device 902 in response to the time division operation of UWB communication. Since the data frame 1300 may included in at least one ranging response message received from the external device 902 described at step 1103, step 909 in which the third part 1303 of the data frame 1300 is received may be performed simultaneously with step 1103 in which at least one RF signal (or response) is received from the external device or during performance of step 1103.

At step 911, the electronic device 900 may measure a second AOA, based on the third part 1303 of the data frame 1300 received from the external device 902. Referring to FIG. 10, the processor 990 may determine a phase difference between a signal received through the second antenna 920 and a signal received through the third antenna 930, based on a difference of respective timings at which an RF signal corresponding to the third part 1303 of the data frame 1300 is received through the second antenna 920 and the third antenna 930. The processor 990 may determine a second AOA $\theta_2$ of an RF signal received from the external device 902, based on the determined phase difference, a wavelength of the received RF signal, and a distance D1 by which the second antenna 920 and the third antenna 930 are spaced apart. Similarly to step 905, the processor 990 may compare an STS packet corresponding to the third part 1303 of the data frame 1300 and a cross-correlation with a stored STS sequence to calculate a CIR. The processor 990 may determine the second AOA for the external device 902 from the STS packet, based on the calculated CIR. The STS packet of the third part 1303 may not include time stamp information. Electronic devices (e.g., the electronic device 900 and the external device 902) performing UWB communication may generate an STS packet, based on a pre-defined packet, and may change an index value every transmission period. The electronic devices performing the UWB communication include a previous index value (e.g., an index value of the first part 1301) even if there is an attack such as hacking from the outside on the air, and thus may be safe from an external attack. The distance D2 between the first antenna 910 and the third antenna 930 may imply a distance between the first point P1 and the third point P3, and the distance D1 between the second antenna 920 and the third antenna 930 may imply a distance between the second point P2 and the third point P3. The distance D2 may be greater than the distance D1. The distance D1 and the distance D2 may be less than or equal to a specified distance (e.g., a half wavelength λ/2 of a signal to be received through the patch antenna 400).

At step 913, the electronic device 900 may determine the location of the external device, based on a measured distance value, the first AOA, and the second AOA. The processor 990 may measure the location of the external device 902, based on the distance to the external device 90 measured at step 901, the first AOA $\theta_1$ determined at step 905, and the second AOA $\theta_2$ measured at step 911. The processor 990 may obtain information on a magnetic north direction through the sensor unit 976. The processor 990 may determine a direction of the external device 902 (or an azimuth angle of the external device 902), based on the obtained information on the magnetic north direction, the first AOA $\theta_1$, and the second AOA $\theta_2$. The processor 990 may detect the location of the external device 902, based on the determined direction of the external device 902 and the distance to the external device 902 determined at step 901.

Since the electronic device 900 determines the location of the external device 902 by using the first AOA information and second AOA information obtained through antennas arranged in different angles within one data frame of UWB communication, accuracy of location measurement of the external device 902 can be improved, and the location measurement can be less affected by a posture (e.g., portrait or landscape) of the electronic device 900. The electronic device 900 can adaptively measure the location of the external device 902 for various wireless communication environments (e.g., an LOS environment or an NLOS environment).

It has been described above that the first part 1301 of the data frame 1300 is received through the first antenna 910 and the third antenna 930 at step 903 of FIG. 9, the antenna is switched at step 907, and the third part 1303 of the data frame 1300 is received through the second antenna 920 and the third antenna 930 at step 909. However, the disclosure is not limited thereto. The first part 1301 of the dada frame 1300 may be received through the second antenna 920 and the third antenna 930, and an activated antenna may be switched to receive the third part 1303 of the data frame 1300 through the first antenna 910 and the third antenna 930.

Figure 14:
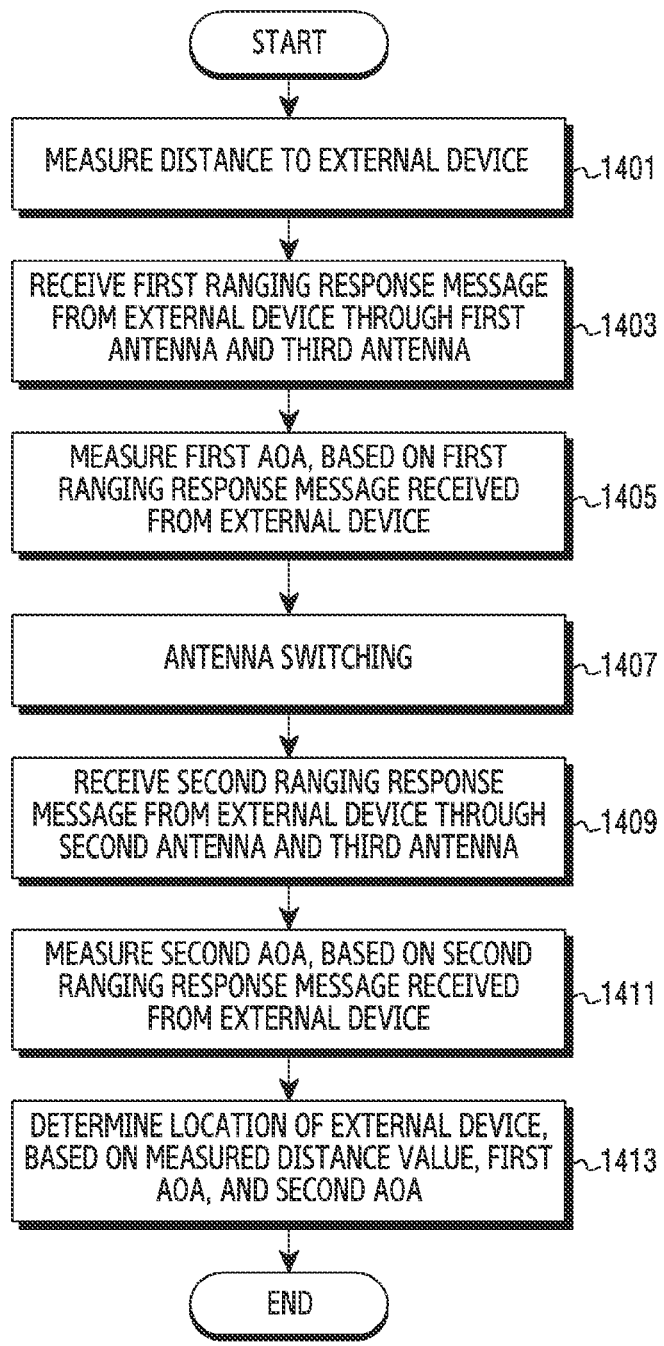
FIG. 14 is a flowchart illustrating an operation in which an electronic device detects a location of an external device, according to another embodiment.

FIG. 14 is a flowchart illustrating an operation in which the electronic device 900 detects a location of the external device 902, according to an embodiment.

The steps of FIG. 14 may be performed in sequence or in parallel. The steps illustrated in FIG. 14 may be performed in sequence from step 1401 to step 1413. Step 1401 may be performed simultaneously with step 1403 to step 1411, or step 1403 to step 1411 may be performed during the performance of step 1401.

The steps illustrated in FIG. 14 may be performed by the electronic device 900 of FIG. 10 or the processor 990 of the electronic device 900.

Referring to FIG. 14, at step 1401, the electronic device 900 may measure a distance to the external device 902. Step 1401 may correspond to step 901 of FIG. 9 and steps 1101 to 1105 of FIG. 11. The processor 990 of the electronic device 900 may transmit at least one ranging request message to the external device 902 as in step 1101 of FIG. 11, and may receive at least one ranging response message from the external device 902 as in step 1103 of FIG. 11. The processor 990 may measure the distance to the external device 902, based on the at least one ranging response message, as in step 1105 of FIG. 11.

At step 1403, the electronic device 900 may receive a first ranging response message from the external device 902 through the first antenna 910 and the third antenna 930. Referring to FIG. 10, the processor 990 may use the wireless communication circuitry 492 to provide control such that the switch circuitry 450 is coupled to the first point P1 of the first conductive patch 410. The processor 990 may receive the first ranging response message including at least one data frame (e.g., the data frame 1300 of FIG. 13) from the external device 902 by using the first antenna 910 and the third antenna 930.

At step 1405, the electronic device 900 may measure a first AOA, based on the first ranging response message received from the external device 902. Referring to FIG. 10, the processor 990 may determine a phase difference between a signal received through the first antenna 910 and a signal received through the third antenna 930, based on a difference of respective timings at which an RF signal corresponding to the first ranging response message is received through the first antenna 910 and the third antenna 930. The processor 990 may determine a first AOA $\theta_1$ of an RF signal received from the external device 902, based on the determined phase difference, a wavelength of the received RF signal, and a distance D2 between the first antenna 910 and the third antenna 930. Step 1405 may correspond to step 905 in which the first AOA is measured based on the first part 1301 of the data frame 1300.

At step 1407, the electronic device 900 may perform antenna switching. After receiving the first ranging response message, and before receiving the second ranging response message, the processor 990 may control the switch circuitry 450 such that the first conductive patch 410 coupled to the first point P1 is coupled to the second point P2. The processor 990 may change a state of the first antenna 910 from an active state to an inactive state, and may change a state of the second antenna 920 from the inactive state to the active state.

At step 1409, the electronic device 900 may receive the second ranging response message from the external device 902 through the second antenna 920 and the third antenna 930. The processor 990 may receive the second ranging response message including at least one data frame (e.g., the data frame 1300 of FIG. 13) by using the second antenna 920 and third antenna 930 which are in an active state.

At step 1411, the electronic device 900 may measure the second AOA, based on the second ranging response message from the external device 902. Referring to FIG. 10, the processor 990 may determine a phase difference between a signal received through the second antenna 920 and a signal received through the third antenna 930, based on a difference of respective timings at which an RF signal corresponding to the second ranging response message is received through the second antenna 920 and the third antenna 930. The processor 990 may determine a second AOA $\theta_2$ of an RF signal received from the external device 902, based on the determined phase difference, a wavelength of the received RF signal, and a distance D1 by which the second antenna 920 and the third antenna 930 are spaced apart. Step 1411 may correspond to Step 911 in which the second AOA is measured based on the third part 1303 of the data frame 1300.

At step 1413, the electronic device 900 may determine the location of the external device, based on a measured distance value, the first AOA, and the second AOA. The processor 990 may measure the location of the external device 902, based on the distance to the external device 902 measured at step 1401, the first AOA $\theta_1$ determined at step 1405, and the second AOA $\theta_2$ measured at step 1411. Step 1413 may correspond to step 913 of FIG. 9.

The electronic device 900 determines the location of the external device 902, based on the first AOA information obtained through the first ranging response message received through the first antenna 910 and the third antenna 930 and the second AOA information obtained through the second ranging response message received through the second antenna 920 and the third antenna 930. Therefore, accuracy of location measurement of the external device 902 can be improved, and the location of the external device 902 can be detected irrespective of a posture (e.g., portrait or landscape) of the electronic device 900. The electronic device 900 can adaptively measure the location of the external device 902 for various wireless communication environments (e.g., an LOS environment or an NLOS environment).

It has been described above that the first ranging response message is received through the first antenna 910 and the third antenna 930 at step 1403 of FIG. 14, the antenna is switched at step 1407, and the second ranging response message is received through the second antenna 920 and the third antenna 930 at step 1409. However, the disclosure is not limited thereto. The first ranging response message may be received through the second antenna 920 and the third antenna 930, and an activated antenna may be switched to receive the second ranging response message through the first antenna 910 and the third antenna 930.

Figure 15:
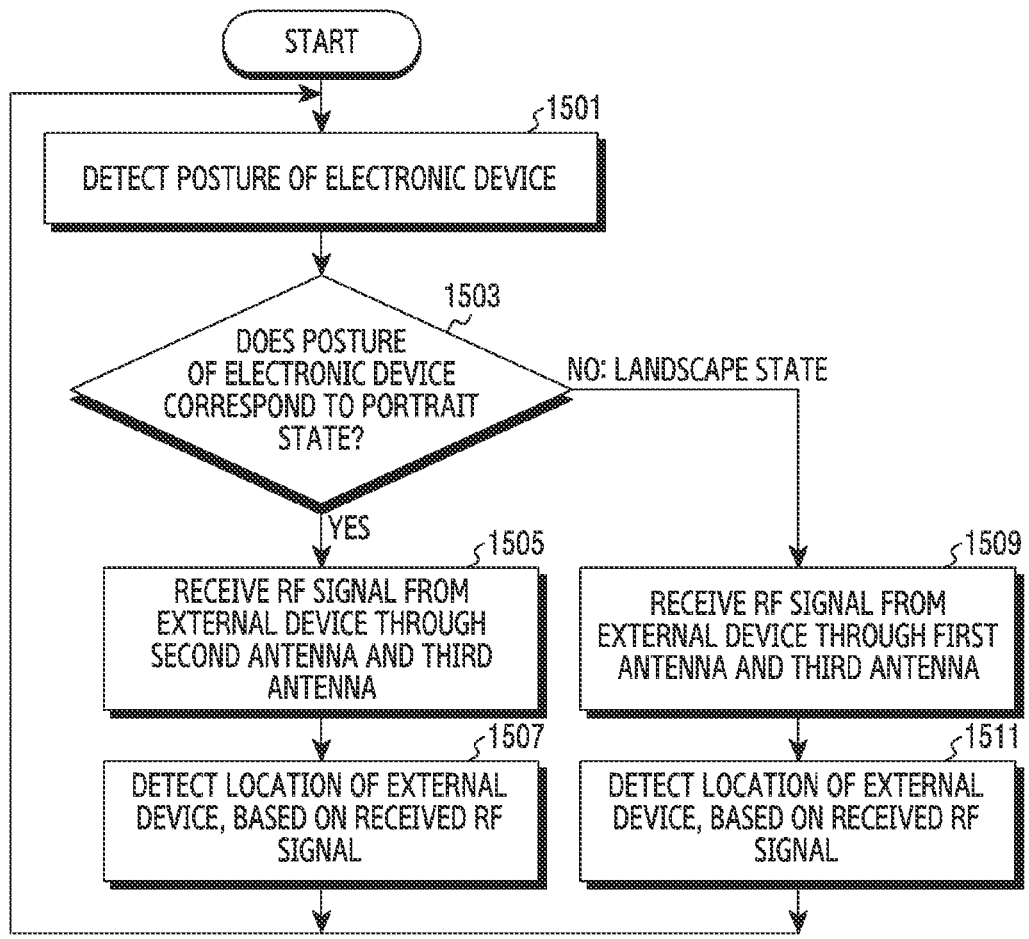
FIG. 15 is a flowchart illustrating an operation in which an electronic device detects a location of an external device, based on a posture of the electronic device, according to an embodiment.

FIG. 15 is a flowchart illustrating an operation in which an electronic device 900 detects a location of an external device 902, based on a posture of the electronic device 900, according to an embodiment.

Figure 16A:
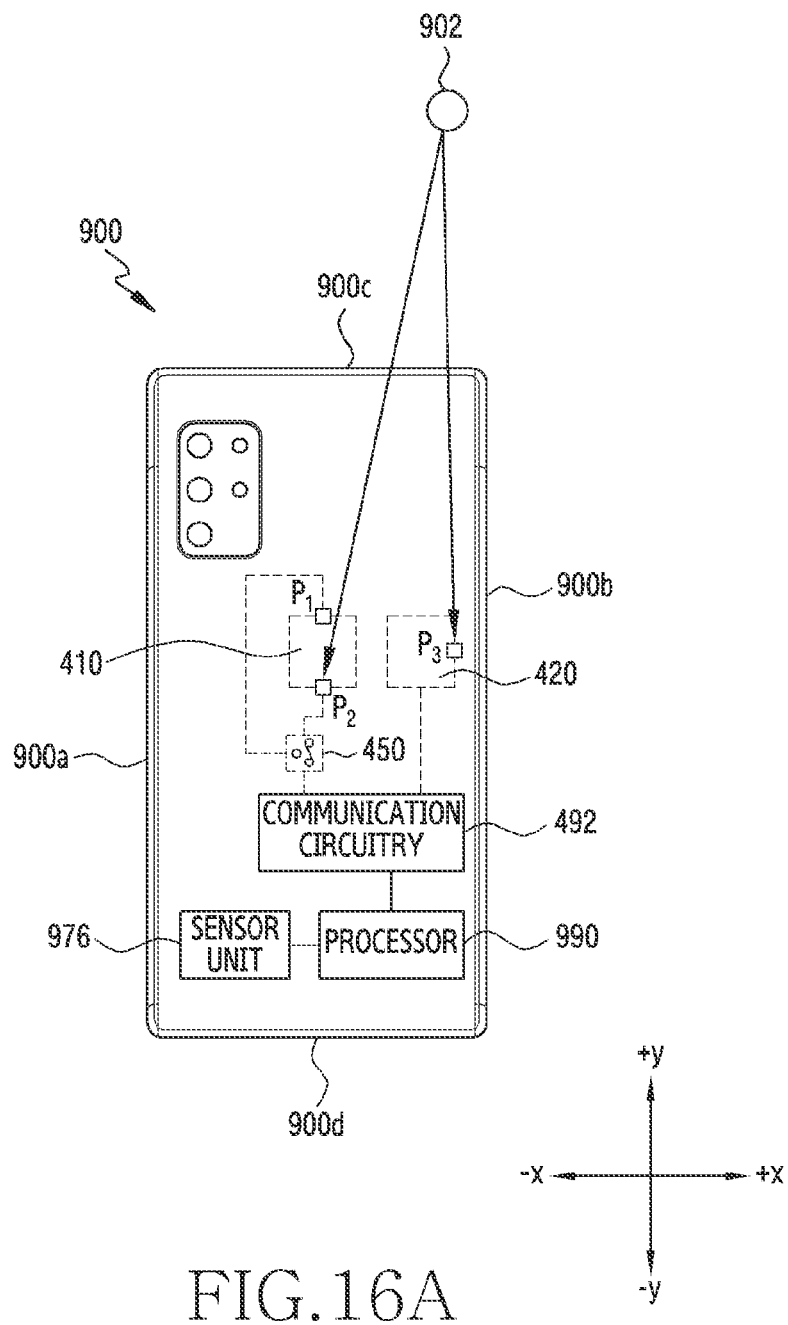
FIG. 16A illustrates a process in which an electronic device detects a location of an external device when a posture of the electronic device is in a portrait state, according to an embodiment.

FIG. 16A illustrates a process in which the electronic device 900 detects a location of the external device 902 when a posture of the electronic device 900 is in a portrait state, according to an embodiment.

Figure 16B:
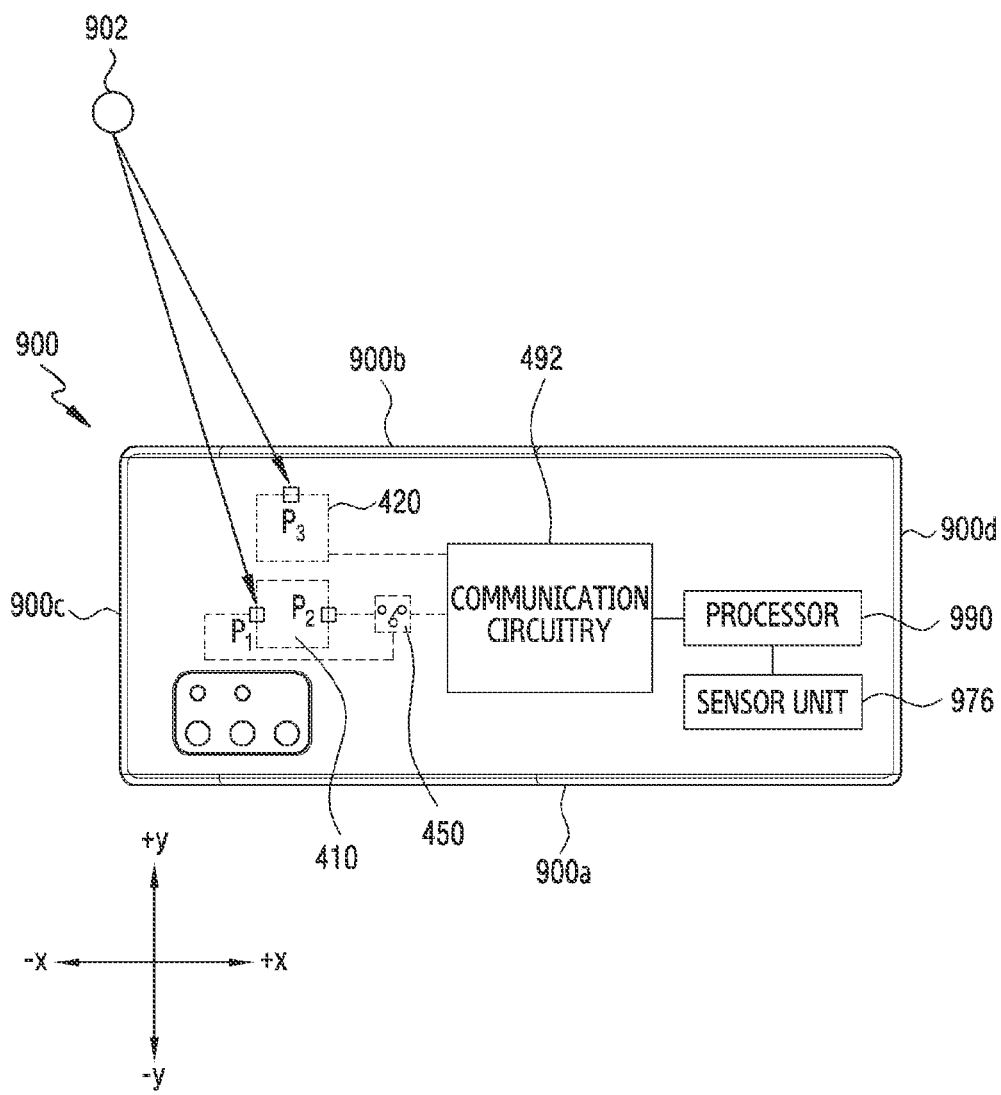
FIG. 16B illustrates a process in which the electronic device detects the location of the external device when the posture of the electronic device is in a landscape state, according to an embodiment.

FIG. 16B illustrates a process in which the electronic device 900 detects the location of the external device 902 when the posture of the electronic device 900 is in a landscape state, according to an embodiment.

Although an alignment relation of a first conductive patch 410 and a second conductive patch 420 and an alignment relation of a first point P1, a second point P2, and a third point P3 are illustrated in FIG. 16A and FIG. 16B on the basis of the patch antenna 400 of FIG. 6B, the disclosure is not limited thereto. The following description may also be applied to a case of the patch antenna 400 of FIG. 6A, FIG. 6C, and FIG. 6D in the same or corresponding manner.

Hereinafter, an operation in which the electronic device of FIG. 15 detects a location of an external device will be described with reference to FIG. 16A and FIG. 16B. When components of FIG. 16A and FIG. 16B have the same reference numerals as the components of FIG. 10, the aforementioned description may be equally applied. The first conductive patch 410 fed at the first point P1 by a wireless communication circuitry 492 may operate as a first antenna (e.g., the first antenna 910 in FIG. 10), and the first conductive patch 410 fed at the second point P2 may operate as a second antenna e.g., the second antenna 920 of FIG. 10). In addition, the second conductive patch 420 fed at the third point P3 may operate as a third antenna (e.g., the third antenna 930 of FIG. 10).

Referring to FIG. 16A and FIG. 16B, the electronic device 900 may include a first side face 900a extending along a first direction (e.g., +y direction of FIG. 16A), a second side face 900b parallel to the first side face 900a, a third side face 900c extending along a second direction (e.g., +x direction of FIG. 16A) perpendicular to the first direction and coupling one end of the first side face 900a (e.g., one end in +y direction of FIG. 16A) and one end of the second side face 900b (e.g., one end in +y direction of FIG. 16A), and a fourth side face 900d parallel to the third side face 900c and coupling the other end of the first side face 900a (e.g., one end in −y direction of FIG. 16A) and the other end of the second side face 900b (e.g., one end in −y direction of FIG. 16A). The first side face 900a and second side face 900 of the electronic device 900 may be constructed to have a relatively longer length than the third side face 900c and the fourth side face 900d.

The electronic device 900 may include a sensor unit 976 electrically coupled with a processor 990. The processor 990 may detect a posture of the electronic device 900 by using the sensor unit 976. The sensor unit 976 may include at least one of a gyro sensor and/or a position sensor, but is not limited thereto. The processor 990 may determine whether a current posture of the electronic device 900 is a portrait state or a landscape state, based on a value obtained through the sensor unit 976.

In the disclosure, when it is said that the posture of the electronic device 900 is the 'portrait state', it may mean a state where the third side face 900c or fourth side face 900d having a relatively short length among side faces of the electronic device 900 is located at a bottom end of the electronic device 900 (e.g., −y direction of FIG. 16A). In the disclosure, when it is said that the posture of the electronic device 900 is the 'portrait state', it may mean a state where the first side face 900a and/or second side face 900b having a relatively long length are located more parallel to a direction of gravity than the third side face 900c and/or fourth side face 900d having a relatively short length among the side faces of the electronic device 900. When a direction in which gravity acts is a direction from +y direction to −y direction in FIG. 16A, the first side face 900a and the second side face 900b may be parallel to the direction of gravity, and the third side face 900c and the fourth side face 900d may be perpendicular to the direction in which gravity acts. In this case, since the first side face 900a and the second side face 900b are located more parallel to the direction of gravity than the third side face 900c and the fourth side face 900d, the posture of the electronic device 900 may be the portrait state.

In the disclosure, when it is said that the posture of the electronic device 900 is the 'landscape state', it may mean a state where the first side face 900a or second side face 900b having a relatively long length among the side faces of the electronic device 900 is located at a bottom end of the electronic device 900 (e.g., −y direction of FIG. 16A). In the disclosure, when it is said that the posture of the electronic device 900 is the 'landscape state', it may mean a state where the third side face 900c and/or fourth side face 900d having a relatively short length are located more parallel to a direction of gravity than the first side face 900a and/or second side face 900b having a relatively long length among the side faces of the electronic device 900. When a direction in Which gravity acts is a direction from +y direction to −y direction in FIG. 16A, the first side face 900a and the second side face 900b may be perpendicular to the direction of gravity, and the third side face 900c and the fourth side face 900d may be parallel to the direction in which gravity acts. In this case, since the third side face 900c and the fourth side face 900d are located more parallel to the direction of gravity than the first side face 900a and the second side face 900b, the posture of the electronic device 900 may be the landscape state.

The 'portrait state' and/or 'landscape state' of the disclosure may be identified by a user interface (UI) and/or user experience (UX) viewed through a display. A UI and/or UX viewed through the display in the 'portrait state' and a UI and/or UX viewed through the display in the 'landscape state' may be substantially perpendicular to each other.

Hereinafter, an operation in which the processor 990 detects a location of the external device 902 according to a posture of the electronic device 900 will be described.

Referring to FIG. 15, at step 1501, the processor 990 of the electronic device 900 may detect a posture of the electronic device 900 by using the sensor unit 976. The sensor unit 976 may detect the posture of the electronic device 900, and may obtain data corresponding to the detected posture. The sensor unit 976 may provide the obtained data to the processor 990. The processor 990 may detect the posture of the electronic device 900, based on the provided data.

At step 1503, the processor 990 of the electronic device 900 may determine whether the posture of the electronic device 900 is the portrait state. The sensor unit 976 may include a 9-axis motion sensor, and the processor 990 may obtain azimuth (or yaw), pitch, and roll values measured from the 9-axis motion sensor. The processor 990 may construct a virtual coordinate space divided into a portrait region and a landscape region, and may determine whether the value measured from the 9-axis motion sensor belongs to the portrait region or the landscape region in the virtual coordinate space. Based on the determination, the processor 990 may determine whether the posture of the electronic device 900 is the portrait state or the landscape state. At step 1503, when it is determined that the posture of the electronic device 900 is the portrait state, step 1505 may be performed, and otherwise (when it is determined that the posture of the electronic device 900 is the landscape state), step 1509 may be performed.

At step 1505, the processor 990 of the electronic device 900 may receive an RF signal from the external device through a second antenna and a third antenna. Referring to FIG. 16A, the first conductive patch 410 electrically coupled with the wireless communication circuitry 492 at the first point P1 may operate as the first antenna, and the first conductive patch 410 electrically coupled with the wireless communication circuitry 492 at the second point P2 may operate as the second antenna. The second conductive patch 420 electrically coupled with the wireless communication circuitry 492 at the third point P3 may operate as the third antenna. The processor 990 may control the switch circuitry 450 such that the wireless communication circuitry 492 is electrically coupled with the first conductive patch 410 at the second point P2, in response to determining that the posture of the electronic device 900 is the portrait state. The processor 990 may receive an RF signal from the external device 902, by using the second antenna and the third antenna.

At step 1507, the processor 990 may detect a location of the external device 902, based on the RF signal received from the external device 902 through step 1505. The processor 990 may calculate an RTT and/or an AOA of an RF signal, based on the RF signal received from the external device 902 through the second antenna and the third antenna. The processor 990 may calculate a distance to the external device 902 based on the RTT, and may calculate a direction of the external device 902 based on the AOA. The processor 990 may detect the location of the external device 902, based on the distance to the external device 902 and the direction of the external device 902. Step 1507 may correspond to steps 1401, 1409, 1411, and 1413 of FIG. 14. At step 1507, the processor 990 may measure the distance to the external device 902 similarly to step 1401. The processor 990 may measure the AOA of the RF signal received from the external device 902 by using the second antenna and the third antenna in a manner corresponding to steps 1409 to 1411. The processor 990 may determine the location of the external device 902, based on the distance to the external device 902 and the measured AOA, in a manner corresponding step 1413.

At step 1509, the processor 990 may receive the RF signal from the external device 902 through the first antenna and the third antenna, in response to determining that the posture of the electronic device 900 is the landscape state at step 1503. Referring to FIG. 16B, the processor 990 may control the switch circuitry 450 such that the wireless communication circuitry 492 is electrically coupled with the first conductive patch 410 at the first point P1, in response to determining that the posture of the electronic device 900 is the landscape state. The first conductive patch 410 electrically coupled with the wireless communication circuitry 492 at the first point P1 may operate as the first antenna. The processor 990 may receive the RF signal from the external device 902, by using the first antenna and the third antenna.

At step 1511, the processor 990 may detect the location of the external device 902, based on the RF signal received from the external device 902 at step 1509. The processor 990 may calculate the RTT and/or the AOA of the RF signal, based on the RF signal received from the external device 902 through the first antenna and the third antenna. The processor 990 may calculate the distance to the external device 902 based on the RTT, and may calculate the direction of the external device 902 based on the AOA. The processor 990 may detect the location of the external device 902, based on the distance to the external device 902 and the direction of the external device 902. Step 1511 may correspond to steps 1401, 1403, 1405, and 1413 of FIG. 14. At step 1507, the processor 990 may measure the distance to the external device 902 similarly to step 1401. The processor 990 may measure the AOA of the RF signal received from the external device 902 by using the first antenna and the third antenna in a manner corresponding to steps 1403 to 1405. The processor 990 may determine the location of the external device 902, based on the distance to the external device 902 and the measured AOA, in a manner corresponding to step 1413.

The aforementioned electronic device may include an FPCB including a first conductive patch and a second conductive patch, a wireless communication circuitry electrically coupled with the first conductive patch and the second conductive patch, and a processor electrically coupled with the wireless communication circuitry. The first conductive patch may be fed from the wireless communication circuitry at a first point located at a first edge of the first conductive patch or a second point located at a second edge different from the first edge, and may operate as an antenna radiator which receives an RF signal of a specified frequency band. The second conductive patch may be fed from the wireless communication circuity at a third point of the second conductive patch, and may operate as an antenna radiator which transmits or receive an RF signal of a specified frequency band. The first conductive patch and the second conductive patch may overlap at least partially, when viewed on a horizontal axis of the FPCB. A distance between the first point and the third point may be a first specified distance less than or equal to a half wavelength $\lambda/2$ of the RF signal. A distance between the second point and the third point may be a second specified distance less than the first specified distance. A first line segment which connects the first point and the third point may have a slope different from that of a second line segment which connects the second point and the third point.

The processor may transmit at least one first RF signal to an external device by using the second conductive patch, receive at least one second RF signal transmitted in response to the at least one first RF signal from the external device, by using the first conductive patch and the second conductive patch, and determine a location of the external device, based on the at least one first RF signal and the at least one second RF signal.

The processor may receive a first part of a data frame of the at least one second RF signal received from the external device by using the first conductive patch coupled at the first point and the second conductive patch coupled at the third point, and identify a first AOA of the at least one second RF signal received from the external device, based on the first part.

The electronic device may include a switch circuitry electrically coupled with the wireless communication circuitry and the first conductive patch. The processor may control the switch circuitry such that the first conductive patch coupled at the first point is electrically coupled with the wireless communication circuitry at the second point while a second part of the data frame of the at least one second RF signal is received from the external device.

The processor may receive a third part of the data frame by using the first conductive patch coupled at the second point and the second conductive patch coupled at the third point, and identify a second AOA of the at least one second RF signal received from the external device, based on the third part.

The first part may include a SYNC packet and an SFD packet. The second part may include a guard packet. The third part may include an STS packet.

The processor may identify an RTT, based on the at least one first RF signal and the at least one second RF signal, and determine a distance between the electronic device and the external device, based on the identified RTT.

The processor may determine a location of the external device, based on the identified first AOA, the identified second AOA, and the determined distance.

The processor may receive a first signal of at least one second RF signal received from the external device, by using the first conductive patch coupled at the first point and the second conductive patch coupled at the third point, and identify a first AOA of the received first signal.

The electronic device may further include a switch circuitry electrically coupled with the wireless communication circuitry and the first conductive patch. The processor may control the switch circuitry such that the first conductive patch coupled at the first point is electrically coupled with the wireless communication circuitry at the second point in response to receiving the first signal.

The processor may receive a second signal of at least one second RF signal received from the external device, by using the first conductive patch coupled at the second point and the second conductive patch coupled at the third point, and identify a second AOA of the received second signal.

The processor may identify an RTT, based on the at least one first RF signal and the at least one second RF signal, determine a distance between the electronic device and the external device, based on the identified RTT, and determine a location of the external device, based on the identified first AOA, the identified second AOA, and the determined distance.

The electronic device may further include at least one sensor which detects a posture of the electronic device. The processor may detect the posture of the electronic device, based on a value obtained by the at least one sensor, if the detected posture of the electronic device is a landscape state, receive the at least one second RF signal from the external device through the first conductive patch coupled at the first point and the second conductive patch coupled at the third point, and if the detected posture of the electronic device is a portrait state, receive the at least one second RF signal from the external device through the first conductive patch coupled at the second point and the second conductive patch coupled at the third point.

The electronic device may further include a PCB on which the processor and the wireless communication circuitry are disposed, and a shield can disposed on the PCB to cover at least one of the processor and the wireless communication circuitry. The FPCB may be disposed on the shield can from the outside of the shield can.

The FPCB may include a first layer, a second layer and a third layer disposed between the first layer and the second layer. The first layer may include a guard ground layer having at least one hole disposed thereon. The second layer may include a ground layer. The third layer may include a dielectric material. The first conductive patch and the second conductive patch may be disposed inside the at least one hole. The guard ground layer and the ground layer may be electrically coupled through at least one first conducive via. Each of the first conductive patch and the second conductive patch may be electrically coupled to the ground layer through at least two second conductive vias.

The aforementioned electronic device may include an FPCB including a first conductive patch and a second conductive patch, a wireless communication circuitry electrically coupled with the first conductive patch and the second conductive patch, and a processor electrically coupled with the wireless communication circuitry. The first conductive patch may be fed from the wireless communication circuitry at a first point located at a first edge of the first conductive patch or a second point located at a second edge different from the first edge, and may operate as an antenna radiator which receives an RF signal of a specified frequency band. The second conductive patch may be fed from the wireless communication circuity at a third point of the second conductive patch, and may operate as an antenna radiator which transmits or receive an RF signal of a specified frequency band. The first conductive patch and the second conductive patch may overlap at least partially, when viewed on a horizontal axis of the FPCB. A distance between the first point and the third point may be a first specified distance less than or equal to a half wavelength $\lambda/2$ of the RF signal. A distance between the second point and the third point may be a second specified distance less than the first specified distance. The third point may be disposed on an edge farthest from the second point among edges of the second conductive patch. A first line segment which connects the first point and the third point may have a slope different from that of a second line segment which connects the second point and the third point.

The processor may transmit at least one first RF signal to an external device by using the second conductive patch coupled at the third point.

The electronic device may further include a switch circuitry electrically coupled with the first conductive patch and the wireless communication circuitry. The processor may allow the wireless communication circuitry to be electrically coupled at the first point of the first conductive patch, by using the switch circuitry, receive at least one second RF signal from the external device, by using the first conductive patch coupled at the first point and the second conductive patch coupled at the third point, and identify a first AOA of the at least one second RF signal.

The processor may allow the wireless communication circuitry to be coupled at the second point of the first conductive patch, by using the switch circuitry, receive the at least one second RF signal from the external device, by using the first conductive patch coupled at the second point and the second conductive patch coupled at the third point, and identify a second AOA of the at least one second RF signal.

The processor may identify an RTT of the RF signal, based on the at least one first RF signal and the at least one second RF signal, and determine a location of the external device, based on the RTT, the first AOA, and the second AOA.

Advantages acquired in the disclosure are not limited to the aforementioned advantages. Other advantages not mentioned herein can be clearly understood by those skilled in the art to which the disclosure pertains from the following descriptions.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) can be stored in a random access memory, a non-volatile memory including a flash memory, a read only memory (ROM), an electrically erasable programmable read only memory (EEPROM), a magnetic disc storage device, a CD-ROM, digital versatile discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a LAN, a wide LAN (WLAN), or a storage area network (SAN) or a communication network configured by combining the networks. The storage device can have an access to a device for performing an embodiment of the disclosure via an external port. In addition, an additional storage device on a communication network can have an access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form can also be expressed in a singular form, or vice versa.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
   a first antenna for an angle of arrival (AOA);
   a second antenna for the AOA;
   a wireless communication circuitry electrically coupled with the first antenna and the second antenna; and
   a processor electrically coupled with the wireless communication circuitry,
   wherein the first antenna is fed from the wireless communication circuitry at a first point located at a first edge of the first antenna for a first AOA or a second point located at a second edge different from the first edge for a second AOA,
   wherein the second antenna is fed from the wireless communication circuitry at a third point of the second antenna for the first AOA or the second AOA,
   wherein a distance between the first point and the third point is a first specified distance less than or equal to a half wavelength $\lambda/2$ of a radio frequency (RF) signal received via the first antenna,
   wherein a distance between the second point and the third point is a second specified distance less than the first specified distance, and
   wherein a first line segment which connects the first point and the third point has a slope different from that of a second line segment which connects the second point and the third point.

2. The electronic device of claim 1, wherein the processor is configured to:
   transmit at least one first RF signal to an external device by using the second antenna;
   receive at least one second RF signal transmitted in response to the at least one first RF signal from the external device, by using the first antenna and the second antenna; and
   determine a location of the external device, based on the at least one first RF signal and the at least one second RF signal.

3. The electronic device of claim 2, wherein the processor is further configured to:
   receive a first part of a data frame of the at least one second RF signal received from the external device by using the first antenna coupled at the first point and the second antenna coupled at the third point; and
   identify the first AOA of the at least one second RF signal received from the external device, based on the first part.

4. The electronic device of claim 3, further comprising a switch circuitry electrically coupled with the wireless communication circuitry and the first antenna,
   wherein the processor is further configured to control the switch circuitry such that the first antenna coupled at the first point is electrically coupled with the wireless communication circuitry at the second point while a second part of the data frame of the at least one second RF signal is received from the external device.

5. The electronic device of claim 4, wherein the processor is further configured to:
   receive a third part of the data frame by using the first antenna coupled at the second point and the second antenna coupled at the third point; and identify the second AOA of the at least one second RF signal received from the external device, based on the third part.

6. The electronic device of claim 5,
wherein the first part includes a synchronization (SYNC) packet and a start of frame delimiter (SFD) packet,
wherein the second part includes a guard packet, and
wherein the third part includes a scrambled timestamp sequence (STS) packet.

7. The electronic device of claim 5, wherein the processor is further configured to:
identify a round trip time (RTT), based on the at least one first RF signal and the at least one second RF signal; and
determine a distance between the electronic device and the external device, based on the identified RTT.

8. The electronic device of claim 7, wherein the processor is further configured to determine a location of the external device, based on the identified first AOA, the identified second AOA, and the determined distance.

9. The electronic device of claim 2, wherein the processor is further configured to:
receive a first signal of the at least one second RF signal received from the external device, by using the first antenna coupled at the first point and the second antenna coupled at the third point; and
identify the first AOA of the received first signal.

10. The electronic device of claim 9, further comprising a switch circuitry electrically coupled with the wireless communication circuitry and the first antenna,
wherein the processor is further configured to control the switch circuitry such that the first antenna coupled at the first point is electrically coupled with the wireless communication circuitry at the second point in response to receiving the first signal.

11. The electronic device of claim 10, wherein the processor is further configured to:
receive a second signal of the at least one second RF signal received from the external device, by using the first antenna coupled at the second point and the second antenna coupled at the third point; and
identify the second AOA of the received second signal.

12. The electronic device of claim 11, wherein the processor is further configured to:
identify a round trip time (RTT), based on the at least one first RF signal and the at least one second RF signal;
determine a distance between the electronic device and the external device, based on the identified RTT; and
determine a location of the external device, based on the identified first AOA, the identified second AOA, and the determined distance.

13. The electronic device of claim 2, further comprising at least one sensor which detects a posture of the electronic device,
wherein the processor is further configured to:
detect the posture of the electronic device, based on a value obtained by the at least one sensor,
in case that the detected posture of the electronic device is a landscape state, receive the at least one second RF signal from the external device through the first antenna coupled at the first point and the second antenna coupled at the third point, and
in case that the detected posture of the electronic device is a portrait state, receive the at least one second RF signal from the external device through the first antenna coupled at the second point and the second antenna coupled at the third point.

14. The electronic device of claim 1, further comprising:
a printed circuit board (PCB) on which the processor and the wireless communication circuitry are disposed; and
a shield can disposed on the PCB to cover at least one of the processor and the wireless communication circuitry,
wherein a flexible PCB (FPCB), on which the first antenna and the second antenna are disposed, is disposed on the shield can from outside of the shield can.

15. The electronic device of claim 1,
wherein an FPCB, on which the first antenna and the second antenna are disposed, includes a first layer, a second layer, and a third layer disposed between the first layer and the second layer,
wherein the first layer includes a guard ground layer including at least one hole,
wherein the second layer includes a ground layer,
wherein the third layer includes a dielectric material,
wherein the first antenna and the second antenna are disposed inside the at least one hole,
wherein the guard ground layer and the ground layer are electrically coupled through at least one first conducive via, and
wherein each of the first antenna and the second antenna is electrically coupled to the ground layer through at least two second conductive vias.

16. An electronic device comprising:
a flexible printed circuit board (FPCB) including a first antenna for an angle of arrival (AOA) and a second antenna for the AOA;
a wireless communication circuitry electrically coupled with the first antenna and the second antenna; and
a processor electrically coupled with the wireless communication circuitry,
wherein the first antenna is fed from the wireless communication circuitry at a first point located at a first edge of the first antenna for a first AOA or a second point located at a second edge different from the first edge for a second AOA,
wherein the second antenna is fed from the wireless communication circuitry at a third point of the second antenna for the first AOA or the second AOA,
wherein the first antenna and the second antenna overlap at least partially, when viewed on a horizontal axis of the FPCB,
wherein a distance between the first point and the third point is a first specified distance less than or equal to a half wavelength $\lambda/2$ of a radio frequency (RF) signal received via the first antenna,
wherein a distance between the second point and the third point is a second specified distance less than the first specified distance,
wherein the third point is disposed on an edge farthest from the second point among edges of the second antenna, and
wherein a first line segment which connects the first point and the third point has a slope different from that of a second line segment which connects the second point and the third point.

17. The electronic device of claim 16, wherein the processor is configured to transmit at least one first RF signal to an external device by using the second antenna coupled at the third point.

18. The electronic device of claim 17, further comprising a switch circuitry electrically coupled with the first antenna and the wireless communication circuitry, wherein the processor is further configured to:
control the wireless communication circuitry to be electrically coupled at the first point of the first antenna, by using the switch circuitry,
receive at least one second RF signal from the external device, by using the first antenna coupled at the first point and the second antenna coupled at the third point, and
identify the first AOA of the at least one second RF signal.

19. The electronic device of claim 18, wherein the processor is further configured to:
control the wireless communication circuitry to be coupled at the second point of the first antenna, by using the switch circuitry,
receive the at least one second RF signal from the external device, by using the first antenna coupled at the second point and the second antenna coupled at the third point, and
identify the second AOA of the at least one second RF signal.

20. The electronic device of claim 19, wherein the processor is further configured to:
identify a round trip time (RTT) of the RF signal, based on the at least one first RF signal and the at least one second RF signal; and
determine a location of the external device, based on the RTT, the first AOA, and the second AOA.

* * * * *